US008774997B2

(12) United States Patent
Ichikawa et al.

(10) Patent No.: US 8,774,997 B2
(45) Date of Patent: Jul. 8, 2014

(54) VEHICLE, CHARGING CABLE, AND CHARGING SYSTEM FOR VEHICLE

(75) Inventors: Shinji Ichikawa, Toyota (JP); Kenji Itagaki, Toyota (JP); Masaru Sasaki, Toyota (JP); Wanleng Ang, Okazaki (JP); Kenji Murasato, Toyota (JP); Atsushi Mizutani, Toyota (JP); Yukihiro Yamamoto, Okazaki (JP); Taira Kikuchi, Toyota (JP); Yoshikazu Kataoka, Seto (JP); Shingo Ieda, Toyota (JP); Hiroki Sawada, Toyota (JP); Yoshinori Fujitake, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 465 days.

(21) Appl. No.: 13/265,070

(22) PCT Filed: Apr. 23, 2009

(86) PCT No.: PCT/JP2009/058058
§ 371 (c)(1),
(2), (4) Date: Dec. 14, 2011

(87) PCT Pub. No.: WO2010/122647
PCT Pub. Date: Oct. 28, 2010

(65) Prior Publication Data
US 2012/0091958 A1    Apr. 19, 2012

(51) Int. Cl.
*B60L 9/00* (2006.01)
*G06F 7/00* (2006.01)
*H02J 7/00* (2006.01)
*B60W 20/00* (2006.01)
*B60K 37/06* (2006.01)

(52) U.S. Cl.
CPC ........... *B60W 20/00* (2013.01); *B60K 37/06* (2013.01); *Y02T 90/14* (2013.01); *Y02T 90/128* (2013.01); *Y02T 90/16* (2013.01); *Y02T 10/70* (2013.01); *Y02T 10/72* (2013.01)
USPC ........................... 701/22; 701/36; 320/109

(58) Field of Classification Search
CPC ....... B60W 20/00; B60K 37/06; Y02T 90/14; Y02T 90/128; Y02T 10/70; Y02T 10/72; Y02T 90/16
USPC ........................ 320/109; 701/22, 36
See application file for complete search history.

(56) References Cited

U.S. PATENT DOCUMENTS 5,202,617 A * 4/1993 Nor .............................. 320/130
5,463,303 A * 10/1995 Hall et al. ...................... 320/108

(Continued)

FOREIGN PATENT DOCUMENTS

CN    101400542 A    4/2009
JP    A-7-123519    5/1995

(Continued)

OTHER PUBLICATIONS

International Search Report issued in International Application No. PCT/JP2009/058058 dated Jul. 28, 2009 (with translation).

*Primary Examiner* — M'Baye Diao
(74) *Attorney, Agent, or Firm* — Oliff PLC

(57) ABSTRACT

In a charging system for a vehicle for charging a power storage device, including the vehicle having the power storage device, and a charging cable for transmitting electric power supplied from an external power supply outside of the vehicle to the power storage device, charging information about charging performed by a charging device is set based on a signal generated by operation of an operation switch provided on a charging connector. This configuration can improve operability during charging.

13 Claims, 21 Drawing Sheets

(56) References Cited

U.S. PATENT DOCUMENTS

| | | | |
|---|---|---|---|
| 5,909,100 A | 6/1999 | Watanabe et al. | |
| 5,926,004 A * | 7/1999 | Henze | 320/109 |
| 6,923,279 B2 * | 8/2005 | Shimane et al. | 180/65.1 |
| 6,945,803 B2 * | 9/2005 | Potega | 439/218 |
| 7,366,584 B2 * | 4/2008 | Brodin et al. | 700/168 |
| 8,508,348 B2 * | 8/2013 | Suzuki et al. | 340/425.5 |
| 2009/0043450 A1 | 2/2009 | Tonegawa et al. | |
| 2009/0312903 A1 * | 12/2009 | Hafner et al. | 701/36 |
| 2010/0145776 A1 * | 6/2010 | Eguchi et al. | 705/13 |
| 2010/0217485 A1 * | 8/2010 | Ichishi | 701/36 |

FOREIGN PATENT DOCUMENTS

| | | |
|---|---|---|
| JP | A-7-193901 | 7/1995 |
| JP | A-10-112354 | 4/1998 |
| JP | A-2009-60728 | 3/2009 |
| WO | WO 2008/143155 A1 | 11/2008 |

* cited by examiner

VEHICLE, CHARGING CABLE, AND CHARGING SYSTEM FOR VEHICLE

TECHNICAL FIELD

The present invention relates to a vehicle, a charging cable, and a charging system for the vehicle, and more particularly to setting of charging information with an operation switch provided on a charging connector.

BACKGROUND ART

In recent years, electrically powered vehicles including a power storage device (such as a secondary battery or a capacitor) and traveling with a driving force generated from electric power stored in the power storage device have been receiving attention as environmentally friendly vehicles. Examples of such electrically powered vehicles include electric vehicles, hybrid vehicles, and fuel cell vehicles. Techniques have been proposed for charging the power storage device included in these electrically powered vehicles by a commercial power supply having high power generation efficiency.

Hybrid vehicles including a power storage device that can be charged by a power supply outside of the vehicles as with electric vehicles are known. For example, the so-called "plug-in hybrid vehicles" are known in which a power storage device can be charged by an ordinary household power supply by connecting a power outlet provided in the house to a charging port provided on the vehicles with a charging cable. This is expected to enhance fuel efficiency of hybrid vehicles.

Japanese Patent Laying-Open No. 07-193901 (PTL 1) discloses a pre-air-conditioning technique of activating an air conditioning device of an electric vehicle before travel of the vehicle, based on an estimated time to start travel of the vehicle, a thermal environment inside and outside of the vehicle (temperatures inside and outside of the vehicle), a state of charge of a power storage device (battery), and a set value for temperature inside of the vehicle, which are set in the air conditioning device in the vehicle by a driver, when charging the battery included in the vehicle by a power supply outside of the vehicle.

CITATION LIST

Patent Literature

PTL 1: Japanese Patent Laying-Open No. 07-193901

SUMMARY OF INVENTION

Technical Problem

In a charging system for a vehicle that can be charged from outside of the vehicle, charging needs to be completed before start of travel of the vehicle. When pre-air-conditioning is performed as in Japanese Patent Laying-Open No. 07-193901 (PTL 1) described above, it is again desirable to complete the pre-air-conditioning immediately before travel of the vehicle, and the driver needs to set a time to start charging or an estimated time to start travel of the vehicle.

In recent years, lithium-ion batteries have been increasingly employed in power storage devices. When maintained in a fully charged state for a long time, a lithium-ion battery is likely to fail or be deteriorated. When a lithium-ion battery is used, therefore, it is more important to complete charging immediately before start of travel of a vehicle.

In Japanese Patent Laying-Open No. 07-193901 (PTL 1) described above, the estimated time to start travel of the vehicle is set with a timer switch provided on the air conditioning device in the vehicle. If the driver makes preparations and performs operations for charging such as connection of a charging cable, however, the work is mainly outside of the vehicle. Thus, if the time to start charging or the estimated time to start travel of the vehicle is set inside of the vehicle, the work inside and outside of the vehicle is required, resulting in inconvenience. Further, space for providing additional setting means is required inside of the vehicle.

The present invention was made to solve such problems, and an object of the present invention is to improve operability during charging in a charging system for a vehicle that can be charged from outside of the vehicle, by setting information required for the charging with an operation switch provided on a charging connector of a charging cable.

Solution to Problem

A vehicle according to the present invention is charged with electric power supplied from an external power supply via a charging cable. The charging cable includes a power line for transmitting the electric power supplied from the external power supply, a first connection unit provided on an end portion of the power line near the vehicle, for being connected to the vehicle, and an operation switch provided on the first connection unit. The vehicle includes a power storage device configured to be charged with the electric power supplied from the external power supply, a vehicle inlet for being connected to the first connection unit, a charging device connected to the vehicle inlet, for converting the electric power supplied from the external power supply to charge the power storage device, and a first control device for controlling the charging device. The first control device includes a charging information setting unit configured to set charging information about charging performed by the charging device based on a signal generated by operation of the operation switch.

Preferably, the charging information includes information about a time to start charging. The first control device further includes a charging control unit configured to control the charging device to start charging after a lapse of the time to start charging that has been set by the charging information setting unit.

Preferably, the operation switch is a release button operated when the first connection unit is disconnected from the vehicle inlet.

Preferably, the first control device further includes a signal input unit configured to detect input of the signal generated by operation of the operation switch while the first connection unit is connected to the vehicle inlet.

Preferably, the charging cable further includes a second control device capable of inputting and outputting a signal from and to the first control device, for outputting operation information based on the signal generated by operation of the operation switch to the first control device, while the first connection unit is connected to the vehicle inlet. The second control device includes an operation information storage unit configured to store the operation information based on the signal generated by operation of the operation switch while the first connection unit is not connected to the vehicle inlet, and an operation information setting unit configured to transmit the operation information stored in the operation information storage unit to the first control device when the first connection unit is connected to the vehicle inlet. The charging information setting unit sets the charging information based on the operation information transmitted from the operation information setting unit.

Preferably, the first control device further includes an operator authentication unit for authenticating an operator to be allowed for operation. The charging information setting unit sets the charging information when the operator to be allowed for operation is authenticated by the operator authentication unit.

Preferably, the vehicle further includes a detection device for detecting an identification signal unique to the vehicle transmitted from a transmitter. The operator authentication unit authenticates the operator to be allowed, for operation when the identification signal is detected by the detection device.

Preferably, the operator authentication unit authenticates the operator to be allowed for operation when the operation switch is operated in a predetermined order of operation.

Preferably, the vehicle further includes a display device for displaying the charging information that has been set by the charging information setting unit.

A charging cable according to the present invention is a charging cable for transmitting electric power supplied from an external power supply to charge a vehicle. The vehicle includes a power storage device to be charged with the electric power supplied from the external power supply, a vehicle inlet for being connected to the charging cable, a charging device connected to the vehicle inlet, for converting the electric power supplied from the external power supply to charge the power storage device, and a first control device for controlling the charging device. The charging cable includes a power line for transmitting the electric power supplied from the external power supply, a first connection unit provided on an end portion of the power line near the vehicle, for being connected to the vehicle inlet, an operation switch provided on the first connection unit, and a second control device capable of inputting and outputting a signal from and to the first control device, for outputting operation information based on a signal generated by operation of the operation switch to the first control device, while the first connection unit is connected to the vehicle inlet. The second control device includes an operation information storage unit configured to store the operation information based on the signal generated by operation of the operation switch while the first connection unit is not connected to the vehicle inlet, and an operation information setting unit configured to transmit the operation information stored in the operation information storage unit to the first control device when the first connection unit is connected to the vehicle inlet.

Preferably, the charging cable further includes a second connection unit for being connected to the external power supply. The operation information storage unit stores the operation information based on the signal generated by operation of the operation switch when the operation switch is operated while the second connection unit is connected to the external power supply.

Preferably, if the first connection unit remains connected to the vehicle inlet after the operation information stored in the operation information storage unit was transmitted to the first control device, the operation information setting unit prohibits transmission of the operation information based on the signal generated by operation of the operation switch even if the operation switch is operated.

A charging system for a vehicle according to the present invention is a charging system for a vehicle for charging a power storage device, including the vehicle including the power storage device, and a charging cable for transmitting electric power supplied from an external power supply outside of the vehicle to the power storage device. The vehicle includes a vehicle inlet for being connected to the charging cable, a charging device connected to the vehicle inlet, for converting the electric power supplied from the external power supply to charge the power storage device, and a first control device for controlling the charging device. The charging cable includes a power line for transmitting the electric power supplied from the external power supply, a first connection unit provided on an end portion of the power line near the vehicle, for being connected to the vehicle inlet, and an operation switch provided on the first connection unit. The first control device includes a charging information setting unit configured to set charging information about charging performed by the charging device based on a signal generated by operation of the operation switch.

Preferably, the charging cable further includes a second control device capable of inputting and outputting a signal from and to the first control device, for outputting operation information based on the signal generated by operation of the operation switch to the first control device, while the first connection unit is connected to the vehicle inlet. The second control device includes an operation information storage unit configured to store the operation information based on the signal generated by operation of the operation switch while the first connection unit is not connected to the vehicle inlet, and an operation information setting unit configured to transmit the operation information stored in the operation information storage unit to the first control device when the first connection unit is connected to the vehicle inlet. The charging information setting unit sets the charging information based on the operation information transmitted from the operation information setting unit.

Advantageous Effects of Invention

According to the present invention, in a charging system for a vehicle that can be charged from outside of the vehicle, operability during charging can be improved by setting information required for the charging with an operation switch provided on a charging connector of a charging cable.

DESCRIPTION OF EMBODIMENTS

Figure 1:
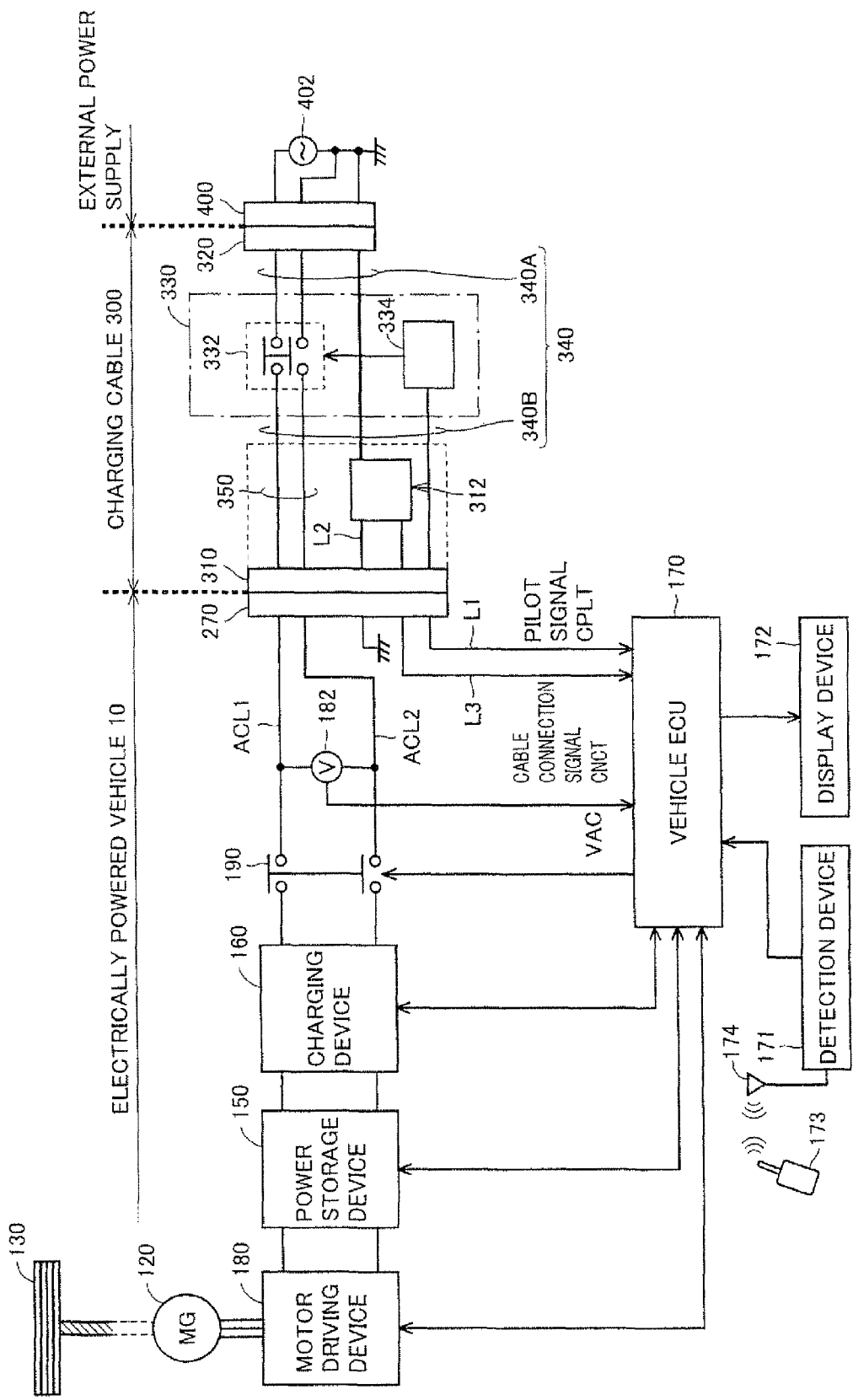
FIG. 1 is a schematic diagram of a charging system for an electrically powered vehicle according to a first embodiment.

Embodiments of the present invention will be described hereinafter in detail with reference to the drawings. It is noted that the same or corresponding parts in the drawings are designated with the same characters, and descriptions thereof will not be repeated.

First Embodiment

FIG. 1 is a schematic diagram of a charging system for an electrically powered vehicle 10 according to a first embodiment. The structure of electrically powered vehicle 10 is not particularly limited so long as vehicle 10 can travel with electric power from a power storage device that can be charged by an external power supply. Examples of electrically powered vehicle 10 include a hybrid vehicle, an electric vehicle, and a fuel cell vehicle. The present invention is also applicable to vehicles other than electrically powered vehicles, so long as they include a chargeable power storage device, such as vehicles that travel with an internal combustion engine.

Referring to FIG. 1, electrically powered vehicle 10 includes a vehicle inlet 270, a relay 190, a charging device 160, a power storage device 150, a motor driving device 180, a motor generator (hereinafter also referred to as "MG") 120, and a wheel 130. Electrically powered vehicle 10 also includes a vehicle ECU (hereinafter also referred to as "ECU (Electronic Control Unit)") 170, a voltage sensor 182, a detection device 171, and a display device 172.

Vehicle inlet 270 is connected to a charging connector 310 of a charging cable 300.

Charging device 160 is connected via relay 190 to vehicle inlet 270 through power lines ACL1, ACL2. Charging device 160 is also connected to power storage device 150. In response to a signal from vehicle ECU 170, charging device 160 converts AC power fed from a vehicle external power supply 402 to DC power capable of charging power storage device 150, and supplies the DC power to power storage device 150.

Power storage device 150 is a chargeable and dischargeable electric power storage element. Power storage device 150 is formed of a secondary battery such as a lithium-ion battery or a nickel-metal hydride battery, or a power storage element such as an electric double layer capacitor.

Power storage device 150 stores the DC power converted in charging device 160. Further, power storage device 150 is connected to motor driving device 180 for driving MG 120, and supplies DC power used for driving the vehicle, while storing electric power generated in MG 120.

Power storage device 150 further includes a voltage sensor (not shown) connected between power lines connected to power storage device 150, and a current sensor (not shown) connected to one of the positive and negative power lines, and outputs detected values of an output voltage and a current signal detected by the sensors to vehicle ECU 170.

Motor driving device 180 is connected to power storage device 150 and MG 120. Motor driving device 180 is controlled by vehicle ECU 170, and converts electric power supplied from power storage device 150 to electric power for driving MG 120. Motor driving device 180 is formed of a three-phase inverter, for example.

MG 120 is connected to motor driving device 180, and to wheel 130 via a power split device, a speed reducer and the like which are not shown. MG 120 receives electric power supplied from motor driving device 180 to generate a driving force for causing electrically powered vehicle 10 to travel. MG 120 also receives a rotation force from wheel 130 to generate AC power, and generates a regenerative braking force in response to a regenerative torque command from vehicle ECU 170. MG 120 is a three-phrase AC motor generator including a rotor having a permanent magnet buried therein and a stator having a Y-connected three-phase coil, for example.

In a hybrid vehicle including an engine (not shown) in addition to MG 120, vehicle ECU 170 performs control such that a ratio of a driving force generated by the engine and a driving force generated by MG 120 is optimal.

Voltage sensor 182 is provided between power lines ACL1 and ACL2, and detects a voltage supplied from external power supply 402. Voltage sensor 182 outputs the detected value of the voltage to vehicle ECU 170.

Relay 190 is inserted in power lines ACL1, ACL2, and controlled by vehicle ECU 170. Relay 190 receives electric power supplied from external power supply 402, and supplies and interrupts the power to charging device 160.

Detection device 171 is capable of transmitting and receiving a signal to and from a transmitter 173, and receives an identification signal unique to a vehicle which is stored in transmitter 173 and corresponds to each vehicle from transmitter 173. Detection device 171 then checks the received identification signal against a predetermined value (unique value) in detection device 171. If the identification signal received from transmitter 173 matches the unique value, detection device 171 detects that an operator having transmitter 173 is the user of vehicle 10. Then, detection device 171 outputs the detection result to vehicle ECU 170.

Detection device 171 includes a communication unit 174. Communication unit 174 is capable of transmitting and receiving a signal to and from transmitter 173 if transmitter 173 exists within a range of a predetermined distance (e.g., about several meters) around communication unit 174. Communication unit 174 and transmitter 173 may have any structures so long as they can transmit and receive a signal in the form of a radio signal (e.g., electric waves, light, infrared rays, ultrasonic waves). The so-called smart key system, keyless entry system or the like is representatively employed.

Display device 172 is provided adjacent to vehicle inlet 270. Display device 172 is controlled by vehicle ECU 170, and displays a timer value until the start of charging that has been set as charging information.

Figure 2:
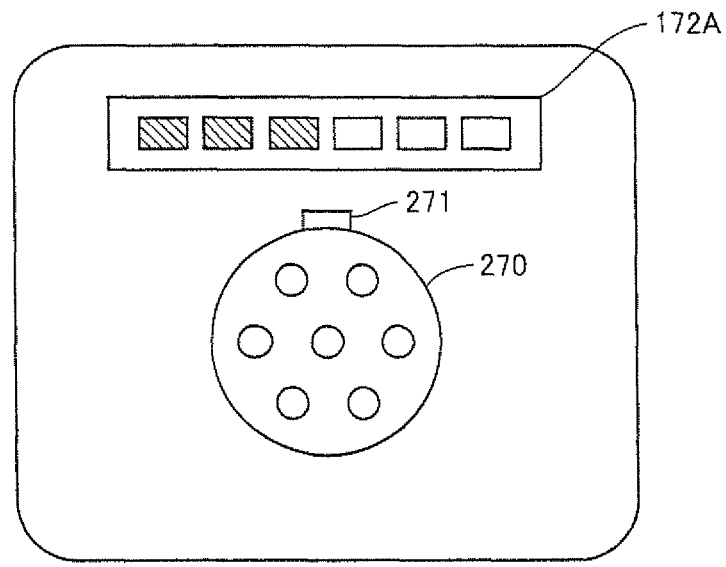
FIG. 2 shows a first example of a display device in the first embodiment.
Figure 3:
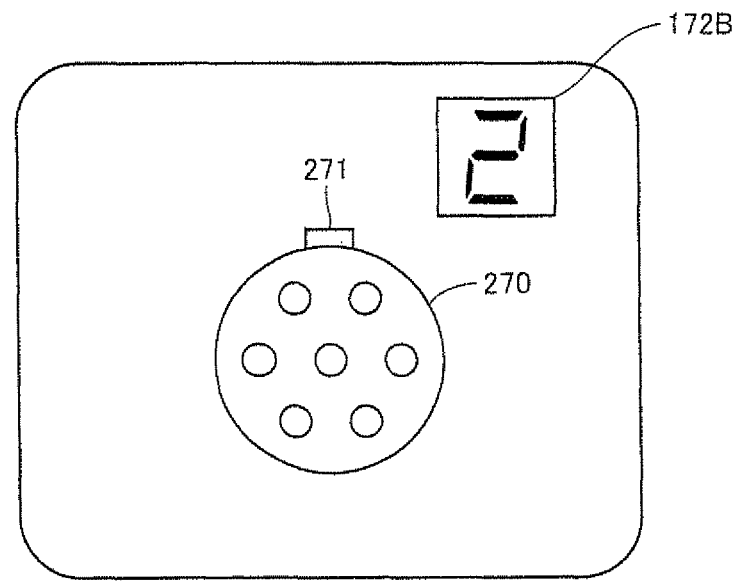
FIG. 3 shows a second example of the display device in the first embodiment.

FIGS. 2 and 3 show examples of display device 172. As display device 172, for example, a plurality of indicating lamps 172A such as LEDs (Light Emitting Diodes) as shown in FIG. 2 may be used to display a set timer value by the number of lighted indicating lamps 172A. Alternatively, an indicator 172B formed of liquid crystal or an LED as shown in FIG. 3 may be used to numerically display a timer value.

Referring back to FIG. 1, vehicle ECU 170 includes a CPU (Central Processing Unit), a storage device, and input/output buffers, although none is shown in FIG. 1, receives signals from the sensors and the like and outputs control instructions to the devices, and controls electrically powered vehicle 10 and the devices. Such control is not limited to software processing, but may be processed by building dedicated hardware (electronic circuitry).

Vehicle ECU 170 receives a cable connection signal CNCT and a pilot signal CPLT from charging cable 300 via vehicle inlet 270. Vehicle ECU 170 also receives a voltage detected value VAC of receiving electric power from voltage sensor 182. Vehicle ECU 170 also receives the detection result of the operator from detection device 171.

Vehicle ECU 170 further receives detected values of current, voltage and temperature from sensors (not shown) provided in power storage device 150 from power storage device 150, and calculates a state quantity indicating a state of charge (hereinafter also referred to as "SOC") of power storage device 150.

Vehicle ECU 170 controls charging device 160, relay 190 and display device 172 in order to charge power storage device 150 based on these pieces of information.

Charging cable 300 includes charging connector 310 provided on an end portion near the vehicle, a plug 320 provided on an end portion near the external power supply, a charging circuit interrupt device (hereinafter also referred to as "CCID") 330, and a power line unit 340 connecting the devices to one another and inputting and outputting electric power and control signals.

Power line unit 340 includes a power line unit 340A connecting plug 320 to CCID 330, and a power line unit 340B connecting charging connector 310 to CCID 330. Power line unit 340 also includes a power line 350 for transmitting electric power from external power supply 402.

Charging cable 300 is connected to a power outlet 400 of external power supply 402 (e.g., a commercial power supply) via plug 320 of charging cable 300 near the external power supply. Vehicle inlet 270 provided on a body of electrically powered vehicle 10 is connected to charging connector 310 of charging cable 300 near the vehicle, to transmit electric power from vehicle external power supply 402 to electrically powered vehicle 10.

Charging connector 310 includes a connection detection circuit 312 therein for detecting connection of charging connector 310, which detects a connection state between vehicle inlet 270 and charging connector 310. Connection detection circuit 312 outputs cable connection signal CNCT indicating the connection state to vehicle ECU 170 of electrically powered vehicle 10 via vehicle inlet 270. Connection detection circuit 312 will be described in detail with reference to FIG. 4.

CCID 330 includes a CCID relay 332 and a control pilot circuit 334. CCID relay 332 is inserted in power line 350 within charging cable 300. CCID relay 332 is controlled by control pilot circuit 334. When CCID relay 332 is off, an electrical path is cut off in charging cable 300. When CCID relay 332 is turned on, on the other hand, electric power can be supplied from external power supply 402 to electrically powered vehicle 10.

Control pilot circuit 334 outputs pilot signal CPLT to vehicle ECU 170 via charging connector 310 and vehicle inlet 270. Pilot signal CPLT is to notify vehicle ECU 170 of a rated current of charging cable 300 from control pilot circuit 334. Pilot signal CPLT is also used to remotely control CCID relay 332 from vehicle ECU 170 based on a potential of pilot signal CPLT controlled by vehicle ECU 170. Control pilot circuit 334 controls CCID relay 332 based on variation in potential of pilot signal CPLT. That is, pilot signal CPLT is supplied and received between vehicle ECU 170 and CCID 330.

Figure 4:
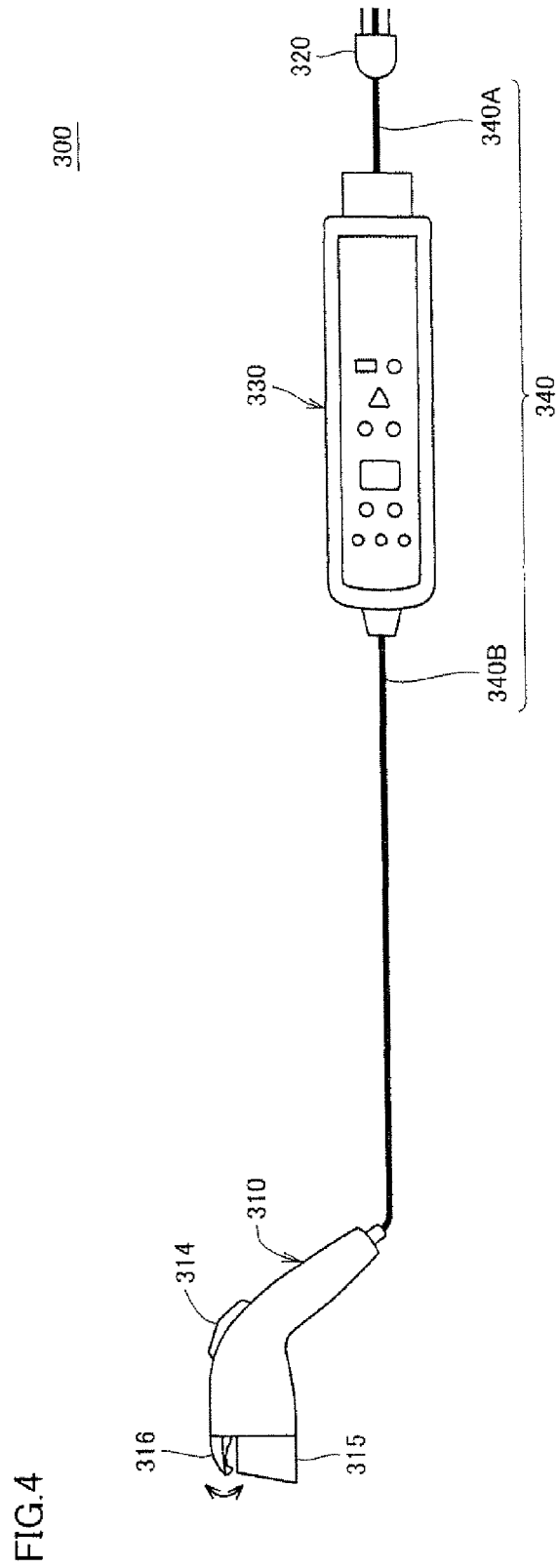
FIG. 4 is a schematic diagram of a charging cable in the first embodiment.

FIG. 4 is a schematic diagram of charging cable 300. Referring to FIGS. 1 and 4, charging cable 300 includes charging connector 310, plug 320, CCID 330, and power line unit 340, as described above. Charging connector 310 includes an operation switch 314, a coupler unit 315, and a latch unit 316.

Coupler unit 315 includes a plurality of connection terminals (not shown), and when coupler unit 315 is inserted in vehicle inlet 270 of electrically powered vehicle 10, power line 350 and signal lines in power line unit 340 are connected to power lines ACL1, ACL2, a control pilot line L1, a ground line L2, and a connection signal line L3.

In the first embodiment, operation switch 314 is a release button for operating latch unit 316 in order to prevent disengagement of charging connector 310, and latch unit 316 operates in response to operation of operation switch 314.

More specifically, when charging connector 310 is connected to vehicle inlet 270, a pawl at a tip of latch unit 316 is brought into engagement with a projection 271 shown in FIG. 2 or 3, thus preventing accidental disengagement of charging connector 310 from vehicle inlet 270. When operation switch 314 is pressed, the pawl at the tip of latch unit 316 is detached from projection 271, allowing charging connector 310 to be disconnected from vehicle inlet 270.

Moreover, as will be described later with reference to FIGS. 5 and 7, operation of operation switch 314 causes a change in signal state of cable connection signal CNCT. Thus, an operation state of operation switch 314 by the operator can be transmitted to vehicle ECU 170.

Figure 5:
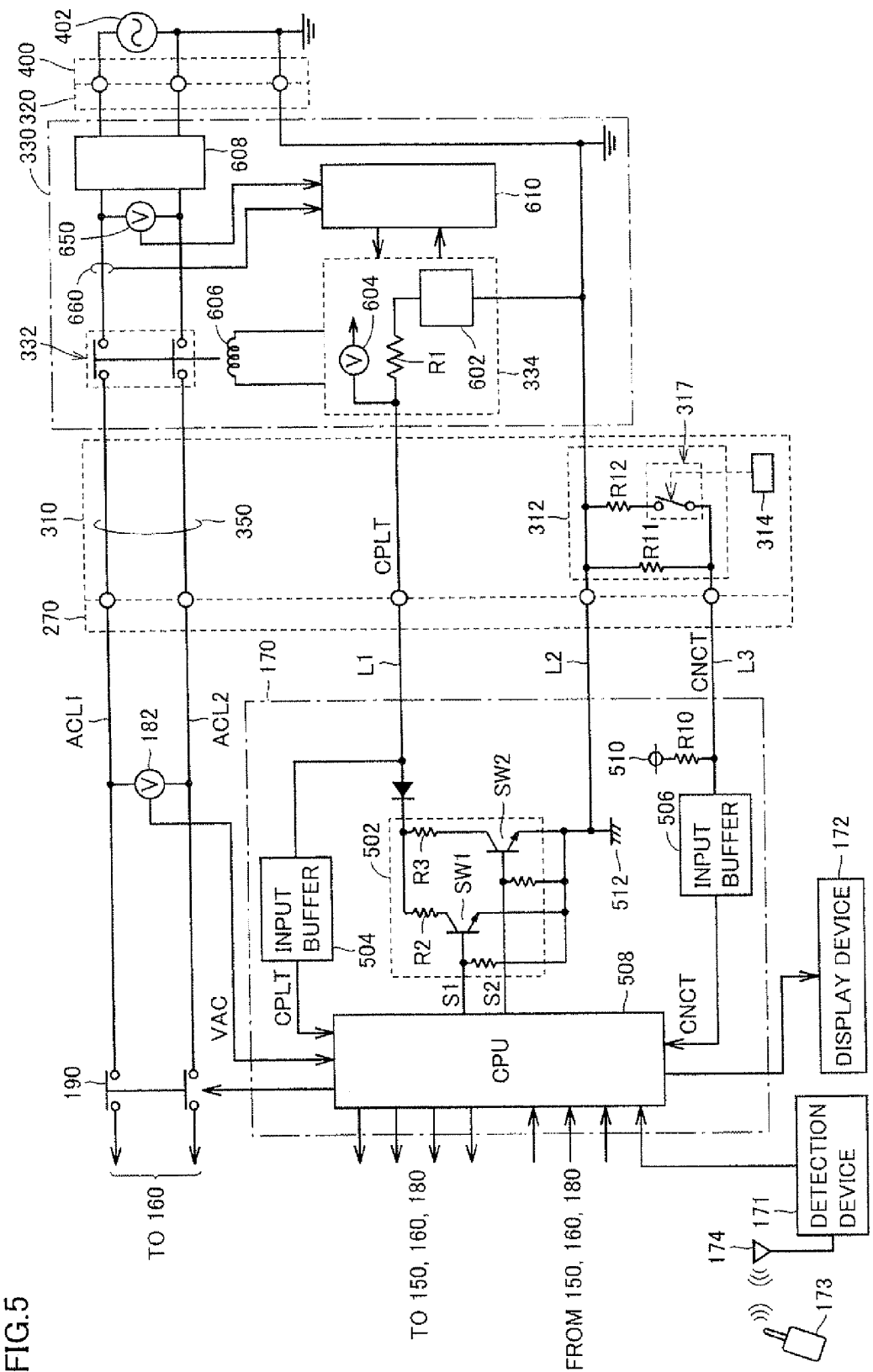
FIG. 5 illustrates a charging circuit shown in FIG. 1 in more detail.

FIG. 5 illustrates the charging circuit shown in FIG. 1 in more detail.

Referring to FIG. 5, CCID 330 includes, in addition to CCID relay 332 and control pilot circuit 334, an electromagnetic coil 606, a leakage detector 608, a CCID control unit 610, a voltage sensor 650, and a current sensor 660. Control pilot circuit 334 includes an oscillator 602, a resistor element R1, and a voltage sensor 604.

CCID control unit 610 includes a CPU, a storage device, and input/output buffers, although none is shown, receives and outputs signals from and to the sensors and control pilot circuit 334, and controls charging operation of charging cable 300.

When a potential of pilot signal CPLT detected by voltage sensor 604 is a predetermined potential, oscillator 602 outputs a non-oscillating signal. When the potential of pilot signal CPLT decreases from the predetermined potential, oscillator 602 is controlled by CCID control unit 610 to output a signal oscillating at a predetermined frequency (e.g., 1 kHz) and in a predetermined duty cycle.

As will be described later with reference to FIG. 7, the potential of pilot signal CPLT can also be controlled by vehicle ECU 170. The duty cycle is set based on a rated current that can be supplied from external power supply 402 to electrically powered vehicle 10 via charging cable 300.

Figure 6:
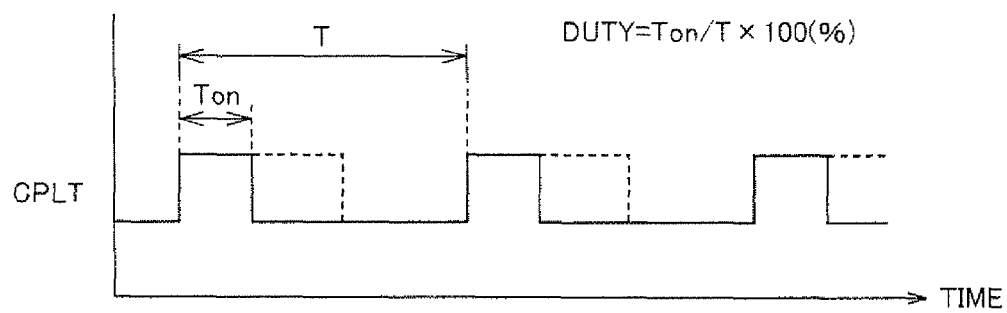
FIG. 6 shows an example of a waveform of a pilot signal CPLT generated by a control pilot circuit shown in FIG. 5.

FIG. 6 shows an example of a waveform of pilot signal CPLT generated by control pilot circuit 334 shown in FIG. 5.

Referring to FIG. 6, when the potential of pilot signal CPLT decreases from the predetermined potential as described above, pilot signal CPLT oscillates in a predetermined cycle T. Here, a pulse width Ton of pilot signal CPLT is set based on the rated current that can be supplied from external power supply 402 to electrically powered vehicle 10 via charging cable 300. That is, with a duty represented as a ratio of pulse width Ton to cycle T, the rated current is notified from control pilot circuit 334 to vehicle ECU 170 of electrically powered vehicle 10 by means of pilot signal CPLT.

It is noted that a rated current is determined for each charging cable 300, and varies with the type of charging cable 300. Thus, a duty of pilot signal CPLT also varies with the type of charging cable 300.

Vehicle ECU 170 of electrically powered vehicle 10 can detect a rated current that can be supplied from external power supply 402 to electrically powered vehicle 10 via charging cable 300, based on a duty of pilot signal CPLT received via control pilot line L1.

Referring back to FIG. 5, when the potential of pilot signal CPLT decreases further by vehicle ECU 170, control pilot circuit 334 supplies a current to electromagnetic coil 606. Electromagnetic coil 606 receives the current from control pilot circuit 334 to generate an electromagnetic force, and closes a contact of CCID relay 332 to turn CCID relay 332 on.

Leakage detector 608 is provided on power line 350 of charging cable 300 in CCID 330, and detects the presence or absence of leakage. More specifically, leakage detector 608 detects a balanced condition of currents flowing through paired power lines 350 in opposite directions, and detects the occurrence of leakage when the balanced condition is lost. Although not particularly shown, when leakage detector 608 detects leakage, power feeding to electromagnetic coil 606 is interrupted, and the contact of CCID relay 332 is opened to turn CCID relay 332 off.

Voltage sensor 650 detects a voltage of external power supply 402 when plug 320 of charging cable 300 near the external power supply is inserted in power outlet 400, and notifies CCID control unit 610 of the detected value. Current sensor 660 detects a charging current flowing through the power lines, and notifies CCID control unit 610 of the detected value.

Connection detection circuit 312 included in charging connector 310 includes pull-down resistors R11, R12, and a limit switch 317.

Limit switch 317 has a contact opened and closed in response to operation of operation switch 314. More specifically, the contact of limit switch 317 is opened while operation switch 314 is not operated, and the contact of limit switch 317 is closed when operation switch 314 is pressed.

While charging connector 310 is connected to vehicle inlet 270, pull-down resistor R11 is connected between ground line L2 and connection signal line L3. Further, pull-down resistor R12 and limit switch 317 are connected in series between ground line L2 and connection signal line L3. That is, pull-down resistor R12 has one end connected to limit switch 317, and the other end connected to ground line L2. Limit switch 317 has one end connected to pull-down resistor R12, and the other end connected to connection signal line L3.

Connection detection circuit 312 generates a voltage signal, which is determined based on a voltage (e.g., 12 V) of a power supply node 510 and a pull-up resistor R10 included in vehicle ECU 170, and pull-down resistors R11, R12, in connection signal line L3 as cable connection signal CNCT.

Vehicle ECU 170 detects this potential generated in connection signal line L3, to detect a connection state of charging connector 310 and an operation state of operation switch 314.

In the vehicle, on the other hand, vehicle ECU 170 includes, in addition to power supply node 510 and pull-up resistor R10 described above, a resistor circuit 502, input buffers 504, 506, and a CPU 508. Resistor circuit 502 includes pull-down resistors R2, R3, and switches SW1, SW2. Pull-down resistor R2 and switch SW1 are connected in series between control pilot line L1 for communicating pilot signal CPLT and a vehicle ground 512. Pull-down resistor R3 and switch SW2 are also connected in series between control pilot line L1 and vehicle ground 512. Switches SW1, SW2 are controlled to be on or off in response to control signals S1, S2 from CPU 508, respectively.

Resistor circuit 502 is to control a potential of pilot signal CPLT from electrically powered vehicle 10.

Input buffer 504 receives pilot signal CPLT in control pilot line L1, and outputs received pilot signal CPLT to CPU 508. Input buffer 506 receives cable connection signal CNCT from connection signal line L3 connected to connection detection circuit 312 of charging connector 310, and outputs received cable connection signal CNCT to CPU 508. As described above, vehicle ECU 170 applies a voltage to connection signal line L3, and a potential of cable connection signal CNCT varies with connection of charging connector 310 to vehicle inlet 270 and operation of operation switch 314. Accordingly, by detecting the potential of cable connection signal CNCT, CPU 508 can detect a connection state of charging connector 310 and an operation state of operation switch 314.

CPU 508 receives pilot signal CPLT and cable connection signal CNCT from input buffers 504 and 506, respectively.

CPU 508 detects a potential of cable connection signal CNCT to detect a connection state of charging connector 310 and an operation state of operation switch 314.

CPU 508 further detects an oscillation state and a duty cycle of pilot signal CPLT to detect a rated current of charging cable 300, as shown in FIG. 6.

CPU 508 then controls control signals S1, S2 for switches SW1, SW2 based on the potential of cable connection signal CNCT and the oscillation state of pilot signal CPLT, to control the potential of pilot signal CPLT. As a result, CPU 508 can remotely control CCID relay 332. Then, electric power is transmitted from external power supply 402 to electrically powered vehicle 10 via charging cable 300.

When the contact of CCID relay 332 is closed, CPU 508 closes a contact of relay 190. As a result, AC power is supplied from external power supply 402 to charging device 160 (FIG. 1), to complete preparation for charging of power storage device 150 (FIG. 1) from external power supply 402. Then, CPU 508 outputs a control signal to charging device 160 (FIG. 1) to perform power conversion, to charge power storage device 150 (FIG. 1).

In a charging system for charging a vehicle by a power supply outside of the vehicle via a charging cable, setting of charging information such as setting of a timer until the start of charging may be made in a vehicle (e.g., a console unit of a driver's seat) or in a control device of the charging cable (e.g., CCID 330 in FIG. 4).

If preparations for charging such as connection of a charging cable are made, however, the work is mainly outside of the vehicle. Thus, if setting of charging information is made inside of the vehicle, the work inside and outside of the vehicle is required, resulting in poor operability.

Furthermore, if setting of charging information is made in the control device of the charging cable, operation devices such as a switch for setting the charging information and a display device for checking the setting need to be provided in the control device, which may result in a larger body of the control device. Since the control device of the charging cable is provided in an intermediate portion of the cable, as shown in FIG. 4, a larger body of the control device results in poorer operability of the charging cable.

In the first embodiment, therefore, in a charging system for charging a vehicle by a power supply outside of the vehicle via a charging cable, charging timer setting control for setting a time to start charging included in charging information is performed with an operation switch (release button) provided on a charging connector which is necessarily operated during preparation for charging.

Figure 7:
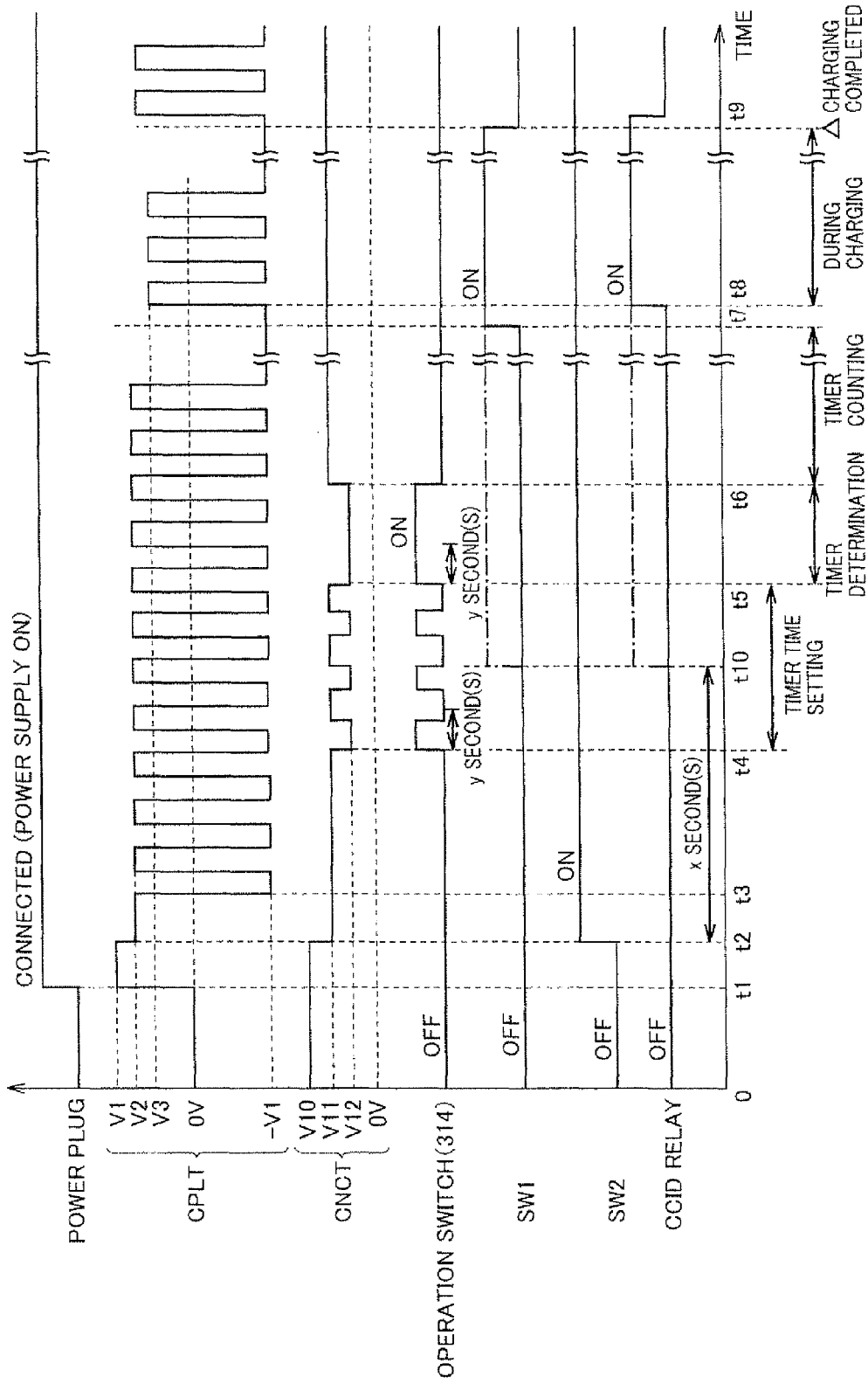
FIG. 7 shows a time chart of each signal for illustrating charging timer setting control by a charging connector in the first embodiment.

FIG. 7 shows a time chart of each signal for illustrating the charging timer setting control by charging connector 310 in the first embodiment. A horizontal axis of FIG. 7 represents time, and a vertical axis represents an insertion state of the power supply plug, a potential of pilot signal CPLT, a potential of cable connection signal CNCT, an operation state of operation switch 314 (or a state of limit switch 317), states of switches SW1, SW2, and a state of CCID relay 332.

Referring to FIGS. 5 and 7, until time t1, charging cable 300 is connected to neither electrically powered vehicle 10 nor external power supply 402. In this state, the switches and CCID relay 332 are off, pilot signal CPLT has a voltage of 0 V, and cable connection signal CNCT has a potential of V10.

At time t1, plug 320 of charging cable 300 is connected to power outlet 400 of external power supply 402, and control pilot circuit 334 receives electric power from external power supply 402 to generate pilot signal CPLT.

At time t1, charging connector 310 of charging cable 300 has not yet been connected to vehicle inlet 270. Pilot signal CPLT has a potential of V1 (e.g., 12 V), and is not oscillating.

At time t2, charging connector 310 is connected to vehicle inlet 270, and the potential of cable connection signal CNCT decreases to V11 (V11<V10) by pull-down resistor R11 of connection detection circuit 312.

Then, CPU 508 detects the connection of charging connector 310 to vehicle inlet 270 by detecting the decrease in potential of cable connection signal CNCT to V11. CPU 508 then activates control signal S2 to turn switch SW2 on. As a result, the potential of pilot signal CPLT decreases to V2 (e.g., 9 V) by pull-down resistor R3 of resistor circuit 502.

Next, at time t3, CCID control unit 610 detects the decrease in potential of pilot signal CPLT to V2, and performs control such that control pilot circuit 334 causes pilot signal CPLT to oscillate. CPU 508 detects a rated current of charging cable 310 by detecting a duty cycle of pilot signal CPLT.

CPU 508 waits for x second(s) from time t2 when charging connector 310 was connected to vehicle inlet 270, to determine whether or not operation switch 314 is operated for charging timer setting.

If operation switch 314 is operated at a time during a period until time t10 which is after a lapse of x second(s) from time t2, e.g., at time t4, CPU 508 determines that operation for charging timer setting has been performed. CPU 508 then starts a timer setting process. The operation of operation switch 314 is detected by closure of the contact of limit switch 317 by operation of operation switch 314, and decrease in potential of cable connection signal CNCT to V12 (V12<V11) by pull-down resistors R11, R12.

The charging timer setting can be made by the order of operation (hereinafter also referred to as "operation pattern") of operation switch 314, e.g., a time during which operation switch 314 is pressed. More specifically, a timer time is set by the number of operations where operation switch 314 is pressed for less than predetermined y second(s) (e.g., one second) (hereinafter also referred to as "short pressing operation") (between time t4 and time t5 in FIG. 7). For example, if the "short pressing operation" is performed three times, the charging timer is set to three hours. Further, if operation switch 314 is pressed for predetermined y second(s) or more (hereinafter also referred to as "long pressing operation"), CPU 508 recognizes that the timer setting has been completed, completes the timer setting process, and stores the set timer time (between time t5 and time t6 in FIG. 7).

Then, CPU 508 starts timer counting from time t6 when the timer setting was completed.

At time t7 which is after a lapse of the set timer time, CPU 508 activates control signal S1 in order to start charging operation, to turn switch SW1 on. As a result, the potential of pilot signal CPLT decreases to V3 (e.g., 6 V) by pull-down resistor R2 (time t8 in FIG. 7).

When CCID control unit 610 detects the decrease in potential of pilot signal CPLT to V3, the contact of CCID relay 332 is closed, and electric power from external power supply 402 is transmitted to electrically powered vehicle 10 via charging cable 300.

Then, in electrically powered vehicle 10, CPU 508 closes the contact of relay 190, and controls charging device 160 (FIG. 1) to start charging of power storage device 150 (FIG. 1).

When the SOC of power storage device 150 (FIG. 1) reaches a predetermined reference value, CPU 508 determines that charging has been completed, and starts a process to stop charging. More specifically, at time t9 in FIG. 7, CPU 508 stops controlling charging device 160 (FIG. 1), and opens the contact of relay 190. CPU 508 also deactivates switch SW1. As a result, the potential of pilot signal CPLT increases to V2.

When CCID control unit 610 detects the increase in potential of pilot signal CPLT to V2, the contact of CCID relay 332 is opened to interrupt electric power from external power supply 402.

If operation switch 314 is not operated between time t2 and time t10 (x second(s)), on the other hand, at time t10, switch SW1 is turned on as indicated with a chain-dotted line in FIG. 7. As a result, CCID relay 332 is turned on to start charging. The subsequent control is similar to that after t8 described above, and thus description thereof will not be repeated.

If a set timer time is reset or modified, the timer setting process of CPU 508 can be started again by performing predetermined operation such as the "long pressing operation" during timer counting. Another example of the predetermined operation may be operation combining the preset "long pressing operation" and "short pressing operation."

If charging connector 310 is disconnected from vehicle inlet 270 during timer time setting or during timer counting, CPU 508 suspends the timer counting, and resets the set timer time (returns it to an initial value). If charging connector 310 is disconnected from vehicle inlet 270 during charging, the charging operation is also suspended and the timer time is reset.

While the above description detailed the charging timer setting when charging cable 300 is connected to both external power supply 402 and vehicle inlet 270, charging cable 300 can be connected only to vehicle inlet 270.

When charging cable 300 is not connected to external power supply 402, power is not supplied to CCID 330, and so the potential of pilot signal CPLT is not varied. Power is supplied to cable connection signal CNCT from vehicle ECU 170, however, and so the potential of cable connection signal CNCT is varied depending on a connection state of charging connector 310 and an operation state of operation switch 314. Accordingly, a timer time can be set if charging connector 310 is connected to vehicle inlet 270. Vehicle ECU 170 may be configured to detect cable connection signal CNCT only when charging cable 300 is connected to external power supply 402 (i.e., when the potential of pilot signal CPLT becomes larger than 0 V in vehicle ECU 170).

After the timer time setting is completed, if a power failure occurs in the external power supply during timer counting, CPU 508 continues the timer counting. If power is recovered before a lapse of the timer time, charging is started as originally planned after a lapse of the timer time. If power is not recovered after a lapse of the timer time, on the other hand, charging is started immediately after power recovery.

Figure 8:
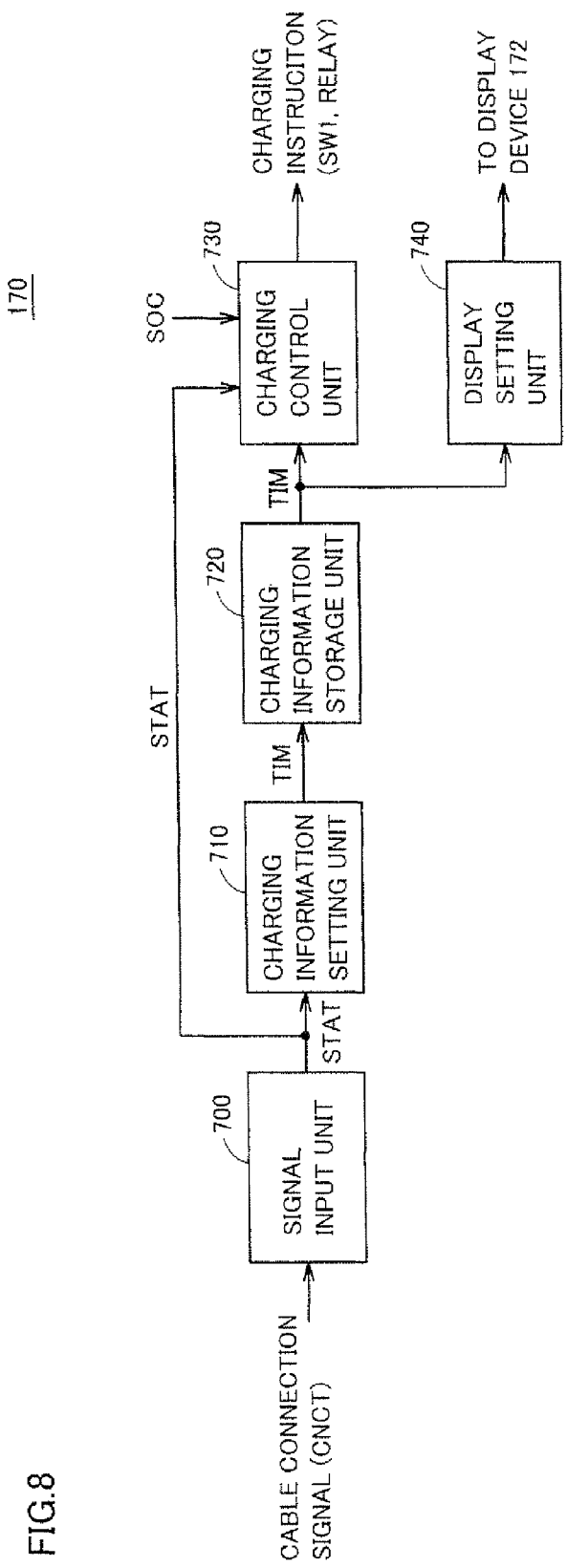
FIG. 8 is a functional block diagram for illustrating the charging timer setting control performed in a vehicle ECU in the first embodiment.
Figure 13:
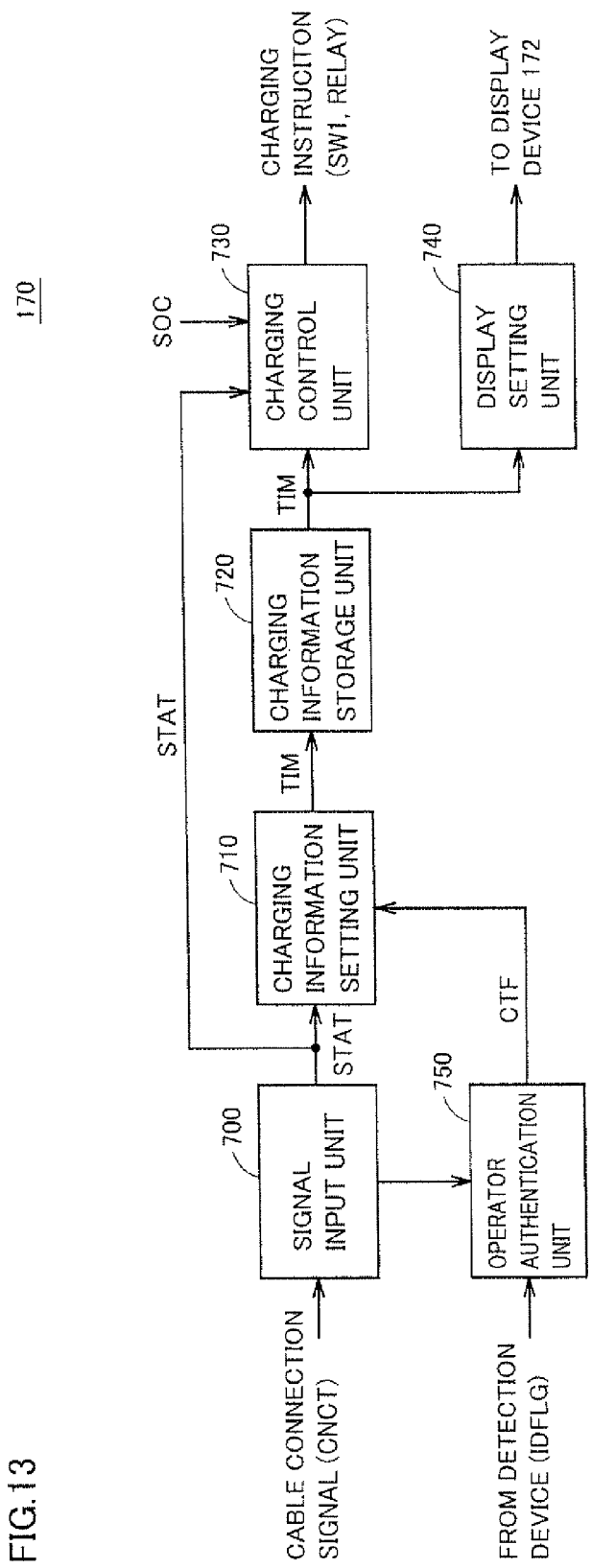
FIG. 13 is a functional block diagram for illustrating charging timer setting control performed in the vehicle ECU in a second modified example.

FIG. 8 is a functional block diagram for illustrating the charging timer setting control performed in vehicle ECU 170. The functional blocks illustrated in the functional block diagrams of FIGS. 8 and 13 are implemented by hardware or software processing by vehicle ECU 170.

Referring to FIG. 8, vehicle ECU 170 includes a signal input unit 700, a charging information setting unit 710, a charging information storage unit 720, a charging control unit 730, and a display setting unit 740.

Signal input unit 700 receives cable connection signal CNCT indicating a connection state of charging connector 310 and an operation state of operation switch 314. Signal input unit 700 outputs, based on a potential of cable connection signal CNCT, a state signal STAT indicating the connection state of charging connector 310 and the operation state of operation switch 314 to charging information setting unit 710 and charging control unit 730.

Charging information setting unit 710 determines, based on state signal STAT from signal input unit 700, whether or not operation switch 314 has been operated within x second(s) after charging connector 310 was connected to vehicle inlet 270. Charging information setting unit 710 also sets a timer time TIM based on the operation pattern of operation switch 314 indicated in state signal STAT from signal input unit 700, and outputs timer time TIM to charging information storage unit 720.

While the above description detailed an example of setting timer time TIM until the start of charging as charging information, the charging information is not limited as such. For example, other time information such as a time to complete charging or a next estimated time to start travel of the vehicle, or information about the other devices that are operated in association with charging operation such as pre-air-conditioning in the vehicle or engine warm-up by a heater or the like performed prior to travel of the vehicle may be set.

Charging information storage unit 720 stores timer time TIM that has been set in charging information setting unit 710.

Display setting unit 740 obtains timer time TIM that has been stored in charging information storage unit 720, and displays information about timer time TIM on display device 172.

Charging control unit 730 receives state signal STAT from signal input unit 700, and the SOC indicating a charged state of power storage device 150. Charging control unit 730 also obtains timer time TIM which is stored charging information from charging information storage unit 720. Charging control unit 730 performs timer counting based on these pieces of information, and after a lapse of set timer time TIM, performs charging operation by controlling switch SW1, relay 190, charging device 160, and the devices that are operated in association with the charging operation.

Figure 9:
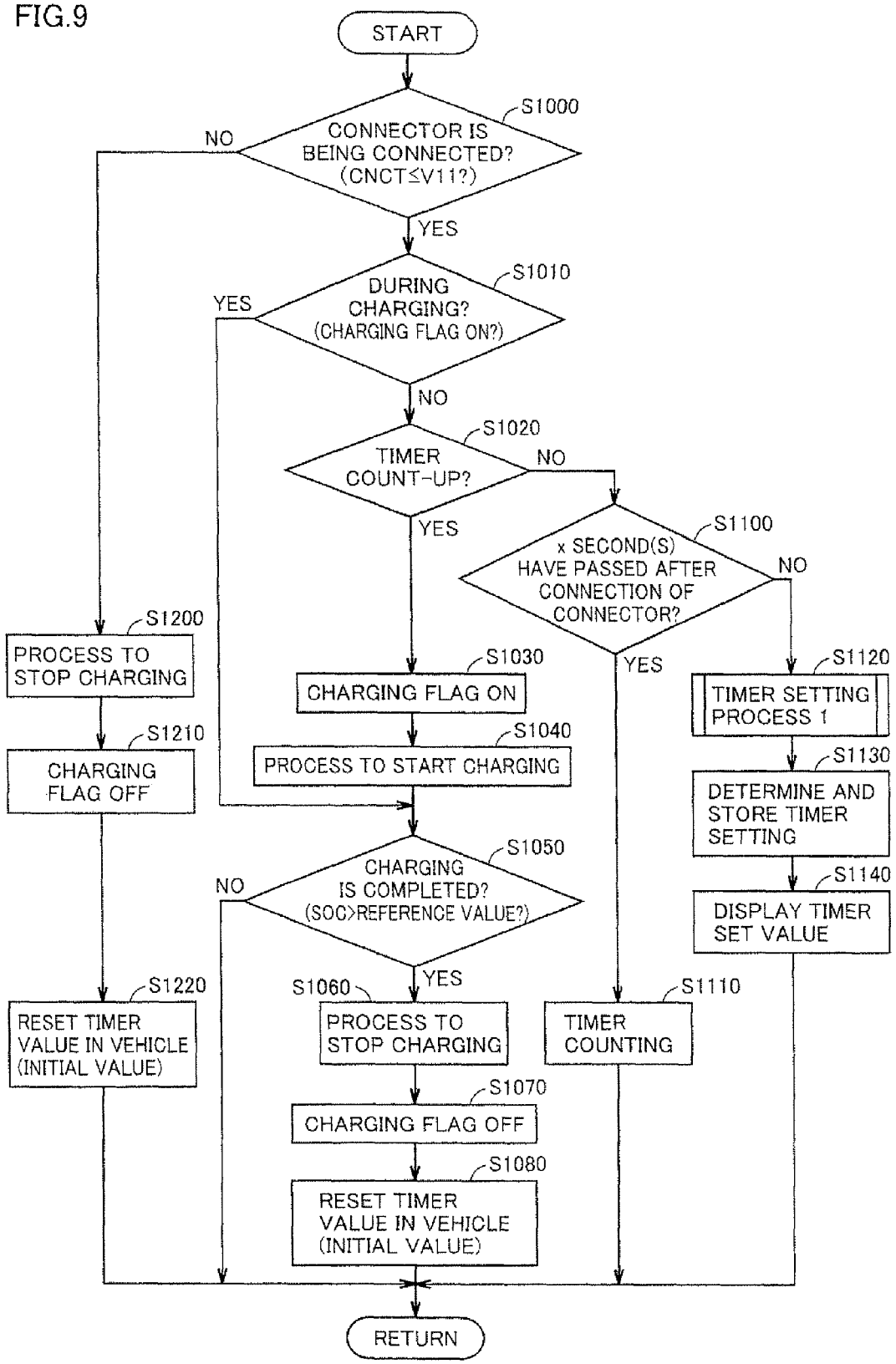
FIG. 9 is a flowchart for illustrating details of the charging timer setting control process performed in the vehicle ECU in the first embodiment.

FIG. 9 shows a flowchart for illustrating details of the charging timer setting control process performed in vehicle ECU 170 in the first embodiment. The flowcharts shown in FIG. 9, and in FIGS. 10 to 12 and 14 to 16 to be described later are implemented by calling a program stored in advance in vehicle ECU 170 from a main routine and executed in a predetermined cycle. Alternatively, some of the steps can be implemented by building dedicated hardware (electronic circuitry).

The following description is given with reference to the times in the time chart shown in FIG. 7, with current time being represented as t.

i) Before connection of charging connector 310 (t<t2)

Referring to FIGS. 5, 7 and 9, in step (hereinafter abbreviated as S) 1000, vehicle ECU 170 determines whether or not a potential of cable connection signal CNCT is V11 or less, namely, whether or not charging connector 310 is being connected to vehicle inlet 270.

Since charging connector 310 has not yet been connected during t<t2 (NO in S1000), the process proceeds to S1200. In S1200, vehicle ECU 170 performs a process to stop charging. In S1210, vehicle ECU 170 turns a charging flag off. Since charging operation has not yet been started during t≤t2, charging remains unstarted in S1200, and the charging flag remains off in S1210.

Then, vehicle ECU 170 resets timer time TIM stored in charging information storage unit 720 shown in FIG. 8, and returns the process to the main routine without performing charging operation. The reset of timer time TIM means setting of a predetermined initial value. An arbitrary time can be set as the initial value, and zero can be set in order to start charging immediately, for example.

ii) After connection of charging connector 310 and before operation of operation switch 314 (t2≤t<t4)

During this time, since charging connector 310 is connected at time t2 (YES in S1000), the process proceeds to S1010.

In S1010, vehicle ECU 170 determines whether or not charging is being performed (namely, whether or not the charging flag is on).

Since charging has not yet been started during t2≤t<t4 (NO in S1010), the process proceeds to S1020, where vehicle ECU 170 determines whether or not timer time TIM has passed. Since timer counting has not yet been started during t2≤t<t4 (NO in S1020), the process proceeds to S1100.

In S1100, vehicle ECU 170 determines whether or not predetermined x second(s) have passed after charging connector 310 was connected to vehicle inlet 270. Since x second(s) have not passed to reach time t10 during t2≤t<t4 (NO in S1100), the process proceeds to S1120.

Figure 10:
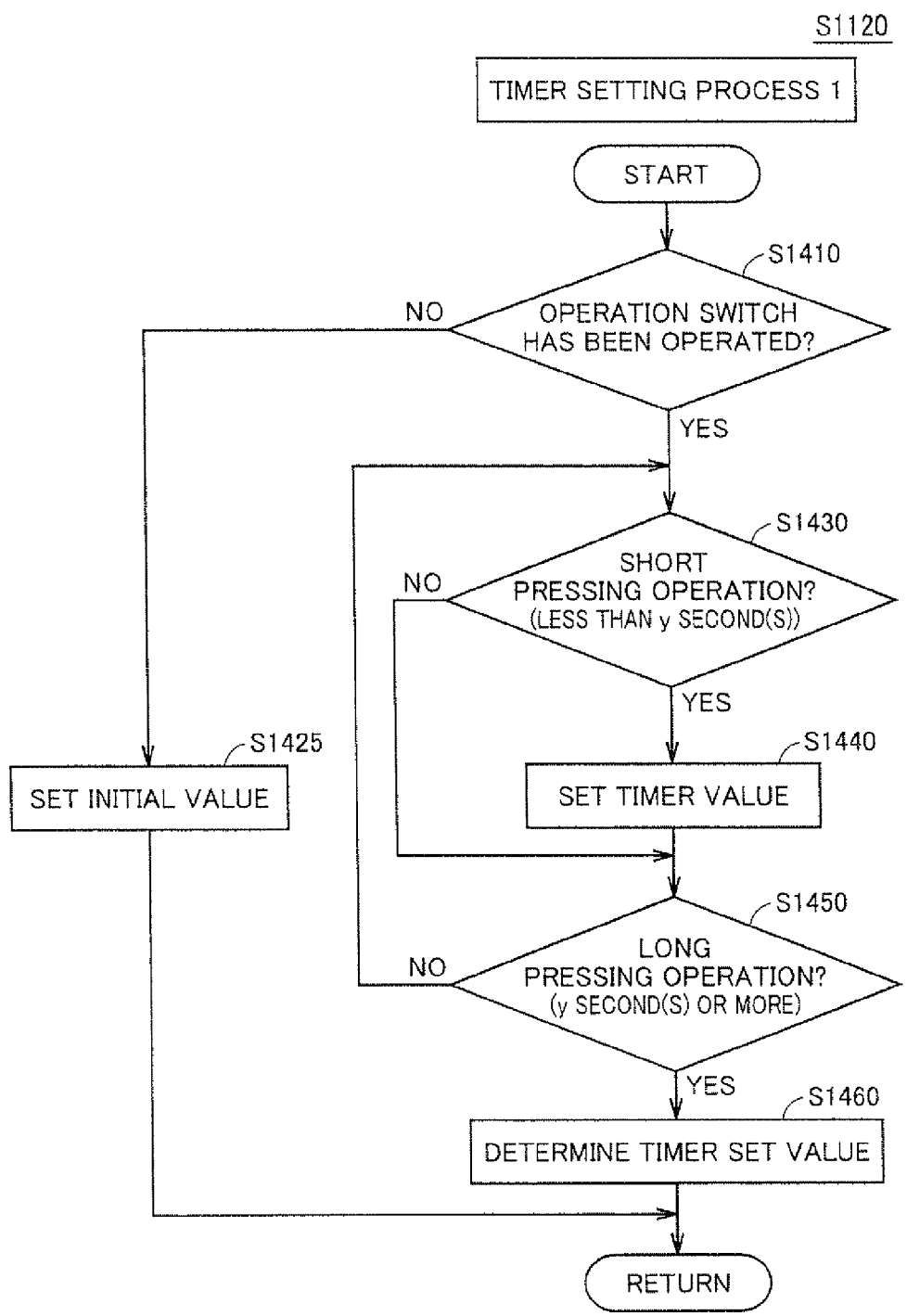
FIG. 10 is a flowchart for illustrating details of a timer setting process of S1120 in FIG. 9.

In S1120, a timer setting process to be described later with reference to FIG. 10 is performed. Since operation switch 314 has not yet been operated during t2≤t<t4, the initial value is set as timer time TIM as will be described later.

In S1130, vehicle ECU 170 completes the timer time setting, and stores timer time TIM in charging information storage unit 720 shown in FIG. 8.

In S1140, vehicle ECU 170 displays stored timer time TIM on display device 172, and the process returns to the main routine.

iii) During timer setting (t4≤t<t6)

At time t4 during t4≤t<t6, charging connector 310 is being connected (NO in S1000), charging is not being performed (NO in S1010), timer counting has not yet been started (NO in S1020), and predetermined x second(s) have not passed (NO in S1100). Accordingly, the timer setting process is performed in S1120.

Since operation switch 314 is operated at time t4, timer time TIM is set by the "short pressing operation" and "long pressing operation" of operation switch 314, as will be described later with reference to FIG. 10.

Although not shown, during setting of timer time TIM with operation switch 314, the process does not proceed to S1110 but proceeds to S1120 even if predetermined x second(s) have passed in S1100.

Then, as described for the case ii), timer time TIM is stored in S1130 and displayed on display device 172 in S1140, and the process returns to the main routine.

iv) After completion of timer setting and before lapse of timer time (t6≤t<t7)

During this time, since charging connector 310 is being connected (NO in S1000), charging is not being performed (NO in S1010), and timer time TIM has not yet passed (NO in S1020), the process proceeds to S1100.

Since x second(s) have passed after charging connector 310 was connected during t6≤t<t7, the process proceeds to S1110.

In S1110, vehicle ECU 170 advances time counting, and returns the process to the main routine.

v) Upon lapse of timer time TIM (t=t7)

Since timer time TIM passes (count-up) at time t7 (YES in S1020), in S1030, vehicle ECU 170 sets the charging flag to be on. Then, in S1040, vehicle ECU 170 starts a process to start charging of power storage device 150 (FIG. 1) in charging control unit 730 in FIG. 8, and controls charging device 160 (FIG. 1) and the like.

In S1050, vehicle ECU 170 determines whether or not charging of power storage device 150 has been completed based on whether or not the SOC has a value larger than the predetermined reference value.

Since charging has just been started and thus not yet been completed at time t7 (NO in S1050), the process returns to the main routine.

vi) After start of charging and before completion of charging (t7<t<t9)

During this time, since charging is being performed and the charging flag is set to be on (YES in S1010), the process is skipped to S1050.

Since charging has not yet been completed during t7<t<t9 (NO in S1050), charging continues to be performed. Then, the process returns to the main routine.

vii) Upon completion of charging (t=t9)

At time t9 when charging is completed (YES in S1050), the process proceeds to S1060.

In S1060, vehicle ECU 170 performs a process to stop charging. More specifically, vehicle ECU 170 stops controlling charging device 160 (FIG. 1), and opens the contact of relay 190. Further, vehicle ECU 170 deactivates switch SW1 to cause the potential of pilot signal CPLT to be V2. As a result, the contact of CCID relay 332 is opened, and electric power from external power supply 402 to electrically powered vehicle 10 is interrupted.

Then, in S1070, vehicle ECU 170 sets the charging flag to be off. Further, in S1080, vehicle ECU 170 returns timer time TIM stored in charging information storage unit 720 to the initial value, and returns the process to the main routine.

After time t9, charging of power storage device 150 (FIG. 1) has been completed, and so charging is not started.

If charging connector 310 is disconnected during timer setting, during timer counting, and during charging (NO in S1000), the process to stop charging is performed even during charging (S1200). Then, the charging flag is set to be off (S1210), and stored timer time TIM is reset.

FIG. 10 shows a flowchart for illustrating details of the timer setting process of S1120 in FIG. 9.

Referring to FIG. 10, in S1410, vehicle ECU 170 determines whether or not operation switch 314 of charging connector 310 has been operated.

If operation switch 314 has not been operated (NO in S1410), timer setting has not been made, and so the process proceeds to S1425, where vehicle ECU 170 sets the initial value as timer time TIM. Then, the process returns to the flow shown in FIG. 9.

If operation switch 314 has been operated (YES in S1410), on the other hand, time setting operation has been performed, and so in S1430, vehicle ECU 170 determines whether or not the "short pressing operation" of operation switch 314 has been performed.

If the "short pressing operation" of operation switch 314 has been performed (YES in S1430), in S1440, vehicle ECU 170 increments a set count of the timer time by one. If the "short pressing operation" of operation switch 314 has not been performed (NO in S1430), S1440 is skipped, and the process proceeds to S1450.

In S1450, vehicle ECU 170 determines whether or not the "long pressing operation" of operation switch 314 has been performed.

If the "long pressing operation" of operation switch 314 has not been performed (NO in S1450), the process returns to S1430, where vehicle ECU 170 further determines whether or not the "short pressing operation" has been performed.

The processes from S1430 to S1450 are repeated until the "long pressing operation" of operation switch 314 is performed, to set timer time TIM.

If the "long pressing operation" of operation switch 314 has been performed (YES in S1450), namely, when the timer setting operation is completed, the process proceeds to S1460, where vehicle ECU 170 determines a final set value for timer time TIM. Then, the process returns to the process shown in FIG. 9. If the "long pressing operation" is performed without the "short pressing operation," vehicle ECU 170 sets the initial value as timer time TIM.

By executing this process, in the charging system for electrically powered vehicle 10 for charging power storage device 150, which includes vehicle 10 having power storage device 150, and charging cable 300 for transmitting electric power supplied from external power supply 402 of the vehicle to power storage device 150, the charging information about charging performed by charging device 160 can be set based on a signal generated by operation of operation switch 314 provided on charging connector 310 of charging cable 300. Such structure can improve operability during charging.

As operation switch 314, a switch dedicated to timer setting (not shown) may be provided separately from the release button such as described above, and the timer setting may be made with this switch. If operation switch 314 doubles as a release button which is operated when charging connector 310 is disconnected as in the first embodiment, a new operation device need not be added to charging connector 310.

First Modified Example

The first embodiment described above detailed an example of resetting timer time TIM to the initial value when charging connector 310 is disconnected from vehicle inlet 270. In this case, however, if charging connector 310 is accidentally disconnected and reconnected during timer counting by a person other than the operator who set the timer, timer time TIM is set to the initial value, which may cause charging to be started immediately after the reconnection of charging connector 310.

Therefore, the first modified example details an example where a previously set timer set value is stored even if charging connector 310 is disconnected from vehicle inlet 270, and charging operation is started in accordance with the previously set timer set value upon reconnection of charging connector 310.

Figure 11:
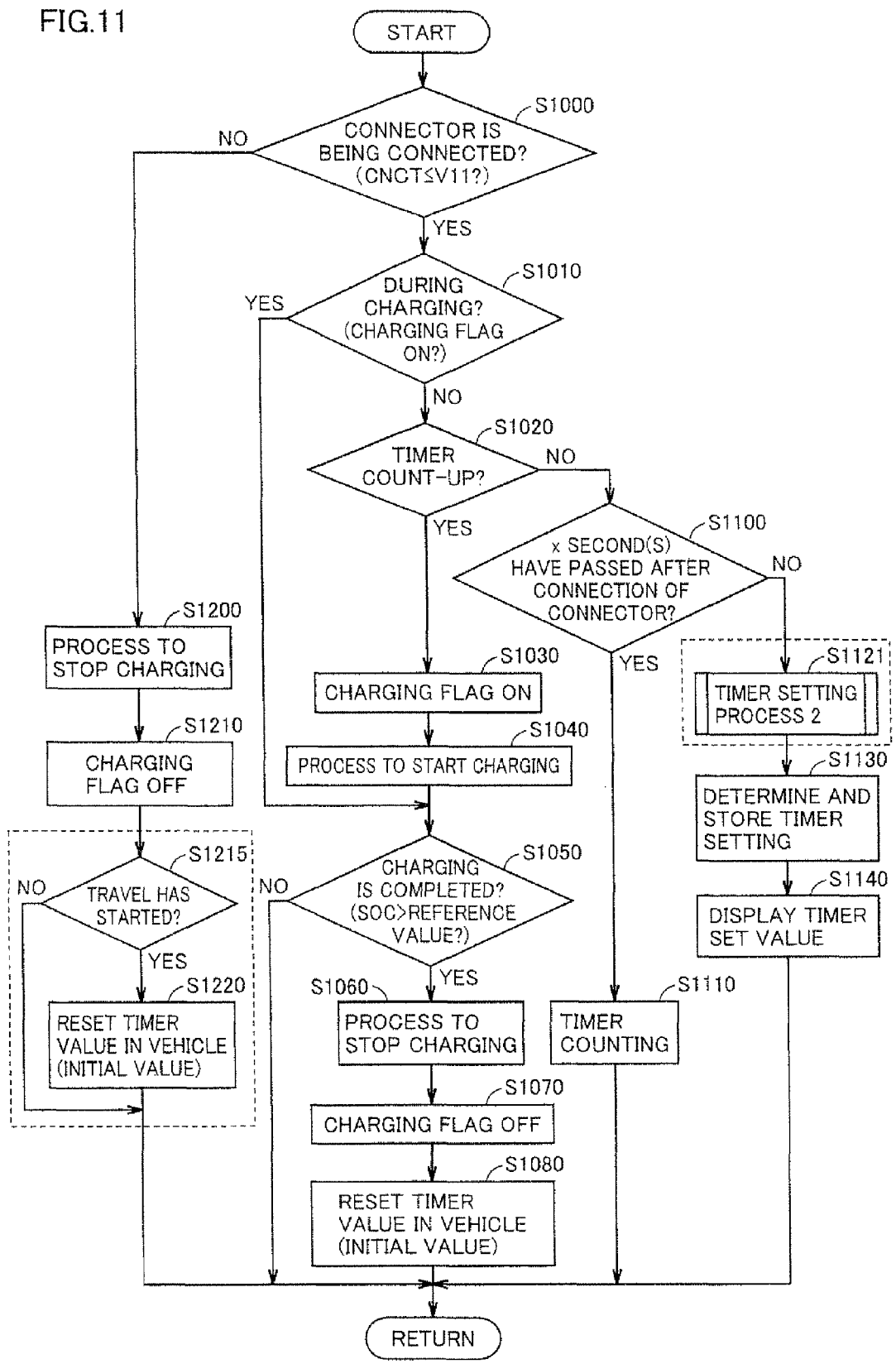
FIG. 11 is a flowchart for illustrating details of a charging timer setting control process performed in the vehicle ECU in a first modified example.

FIG. 11 shows a flowchart for illustrating details of a charging timer setting control process performed in vehicle ECU 170 in the first modified example. In FIG. 11, step S1215 is added to the flowchart of FIG. 9 described in the first embodiment, and S1120 is replaced with a timer setting process of S1121. The descriptions of the steps in FIG. 11 the same as those in FIG. 9 will not be repeated.

Referring to FIG. 11, if charging connector 310 is not being connected in S1000, the process to stop charging is performed in S1200, S1210, and the charging flag is set to be off.

The process then proceeds to S1215, where vehicle ECU 170 determines whether or not electrically powered vehicle 10 has started traveling. The start of travel can be determined based on a detected value from a not-shown vehicle speed sensor or the like, for example.

If electrically powered vehicle 10 has started traveling (YES in S1215), in S1220, vehicle ECU 170 resets timer time TIM to the initial value as in FIG. 9.

If electrically powered vehicle 10 has not started traveling (NO in S1215), on the other hand, S1220 is skipped, and the process returns to the main routine.

In this manner, the previous timer set value is maintained even if charging connector 310 is disconnected after setting of timer time TIM.

Figure 12:
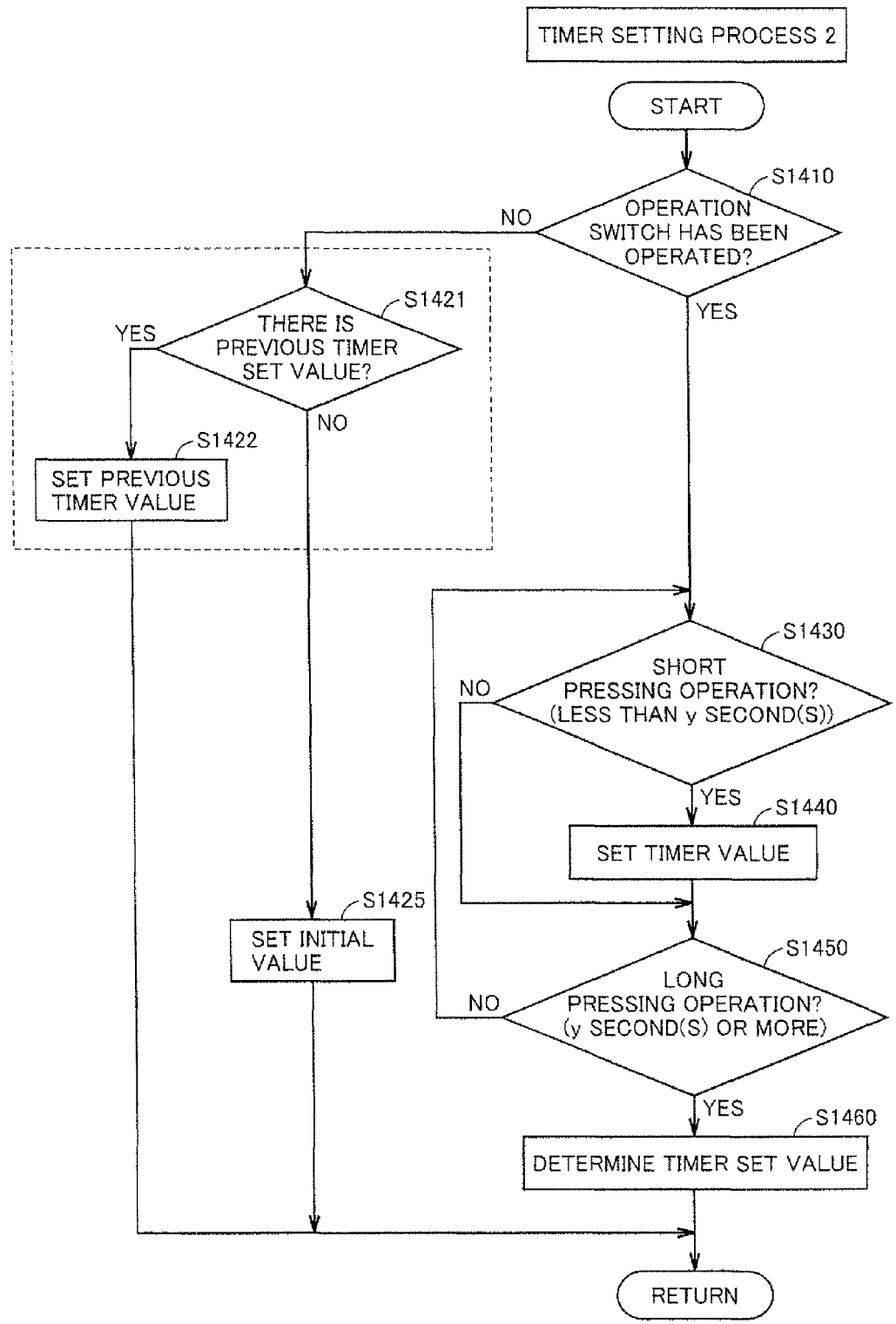
FIG. 12 is a flowchart for illustrating a timer setting process of S1121 in FIG. 11.

FIG. 12 shows a flowchart for illustrating the timer setting process of S1121 in FIG. 11. In FIG. 12, steps S1421 and S1422 are added to the flowchart of the timer setting process of S1120 shown in FIG. 10 described in the first embodiment. The descriptions of the steps in FIG. 12 the same as those in FIG. 10 will not be repeated.

Referring to FIG. 12, if operation switch 314 of charging connector 310 has not been operated in S1410 (NO in S1410), the process proceeds to S1421, where vehicle ECU 170 determines whether or not the previous timer set value has not been reset and has been stored in charging information storage unit 720.

If the previous timer set value has not been reset (YES in S1421), vehicle ECU 170 sets the previous timer set value as timer time TIM again. If the previous timer set value has been reset (NO in S1421), vehicle ECU 170 sets the initial value as timer time TIM.

By executing the control process as described above, even if charging connector 310 is disconnected from vehicle inlet 270, charging operation can be started in accordance with the previously set timer set value when charging connector 310 is reconnected.

Further, since timer time TIM is returned to the initial value if electrically powered vehicle 10 has started traveling, even if vehicle 10 travels without being charged after setting of timer time TIM, charging in accordance with the previous timer set value can be prevented during next charging.

As to timer counting while charging connector 310 is disconnected, a timer count value upon disconnection may be maintained, and the timer counting may be continued upon reconnection. Alternatively, the timer counting may be advanced even while charging connector 310 is disconnected.

Second Modified Example

The first modified example described above detailed an example of storing a previously set timer set value even if charging connector 310 is disconnected. In the first modified example, however, if timer setting operation is performed again with operation switch 314 when charging connector 310 is reconnected, the previously set timer set value may be changed. Thus, if the timer is reset mistakenly (or intentionally) by a person other than the operator who set the timer, charging may be performed at a time different from an estimated time to start charging intended by the operator who set the timer.

Therefore, the second modified example details a configuration further including a function of authenticating an operator in addition to the configuration of the first modified example described above. Such configuration can prohibit timer setting by a person other than an authenticated operator (operator to be allowed for operation), thereby preventing change in timer set value that is not intended by the operator who set the timer.

FIG. 13 is a functional block diagram for illustrating charging timer setting control including the operator authentication function in the second modified example. In FIG. 13, an operator authentication unit 750 is added to the functional block diagram of FIG. 8 described in the first embodiment. The descriptions of the functional blocks in FIG. 13 the same as those in FIG. 8 will not be repeated.

Referring to FIG. 13, vehicle ECU 170 further includes operator authentication unit 750.

Operator authentication unit 750 receives an identification flag IDFLG indicating a result determined by an identification signal unique to a vehicle received by detection device 171 from transmitter 173. Then, operator authentication unit 750 determines whether or not a person is the operator to be allowed for operation based on identification flag IDFLG, as will be described later with reference to FIG. 16.

Operator authentication unit 750 also receives cable connection signal CNCT from signal input unit 700. Operator authentication unit 750 detects operation of operation switch 314 based on cable connection signal CNCT. Then, operator authentication unit 750 determines whether or not an operation pattern of operation switch 314 by the operator matches a preset operation pattern (which corresponds to a security code) for authenticating the operator to be allowed for operation. If the operation pattern of operation switch 314 matches the predetermined operation pattern, operator authentication unit 750 determines that the person is the operator to be allowed for operation regardless of the determination result based on identification flag IDFLG. If operator authentication unit 750 determines that the person is not the operator to be allowed for operation based on identification flag IDFLG, and the operation pattern of operation switch 314 does not mach the predetermined operation pattern, on the other hand, operator authentication unit 750 determines that the person is not the operator to be allowed for operation.

By enabling authentication of the operator by operation of operation switch 314 as well in this manner, the operator to be allowed for operation can be authenticated even if the operator does not have (left) transmitter 173.

Then, operator authentication unit 750 outputs an authentication flag CTF indicating the determination result to charging information setting unit 710. More specifically, operator authentication unit 750 sets authentication flag CTF to be on after determining that the person is the operator to be allowed for operation, and sets authentication flag CTF to be off after determining that the person is not the operator to be allowed for operation.

Charging information setting unit 710 receives state signal STAT from signal input unit 700, and authentication flag CTF from operator authentication unit 750. Then, if authentication flag CTF is on, namely, if it is determined that the person is the operator to be allowed for operation, charging information setting unit 710 determines based on state signal STAT whether or not operation switch 314 has been operated within x second(s) after charging connector 310 was connected to vehicle inlet 270. If operation switch 314 has been operated, charging information setting unit 710 sets timer time TIM based on the operation pattern of operation switch 314 indicated in state signal STAT from signal input unit 700, and outputs set timer time TIM to charging information storage unit 720.

If authentication flag CTF is off, namely, if it is determined that the person is not the operator to be allowed for operation, charging information setting unit 710 does not set timer time TIM with operation switch 314, and a previously set timer set value stored in charging information storage unit 720 is maintained.

Figure 14:
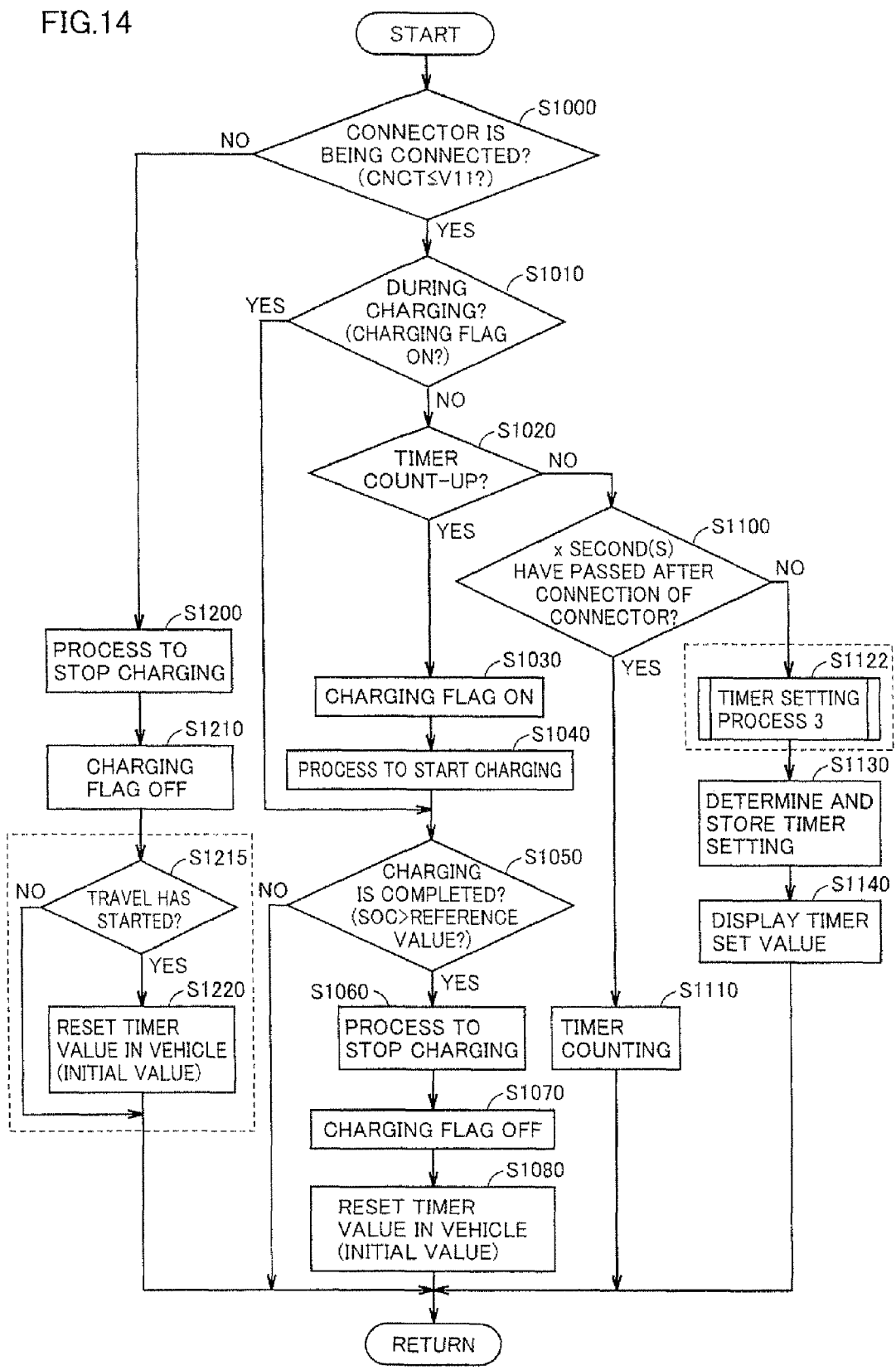
FIG. 14 is a flowchart for illustrating details of the charging timer setting control process performed in the vehicle ECU in the second modified example.

FIG. 14 shows a flowchart for illustrating details of a charging timer setting control process performed in vehicle ECU 170 in the second modified example. In FIG. 14, S1121 in the flowchart of FIG. 11 described in the first modified example is replaced with a timer setting process of S1122. The descriptions of the steps in FIG. 14 the same as those in FIGS. 9 and 11 will not be repeated.

Referring to FIGS. 5 and 14, in S1100, if x second(s) have not passed after charging connector 310 was connected to vehicle inlet 270 (NO in S1100), the process proceeds to S1122.

In S1122, vehicle ECU 170 determines whether or not the person is the operator to be allowed for operation based on identification flag IDFLG received from detection device 171 or the operation pattern of operation switch 314. Then, vehicle ECU 170 sets timer time TIM based on the determination result, and the process proceeds to S1130. The same process as that of FIG. 11 is executed thereafter.

Figure 15:
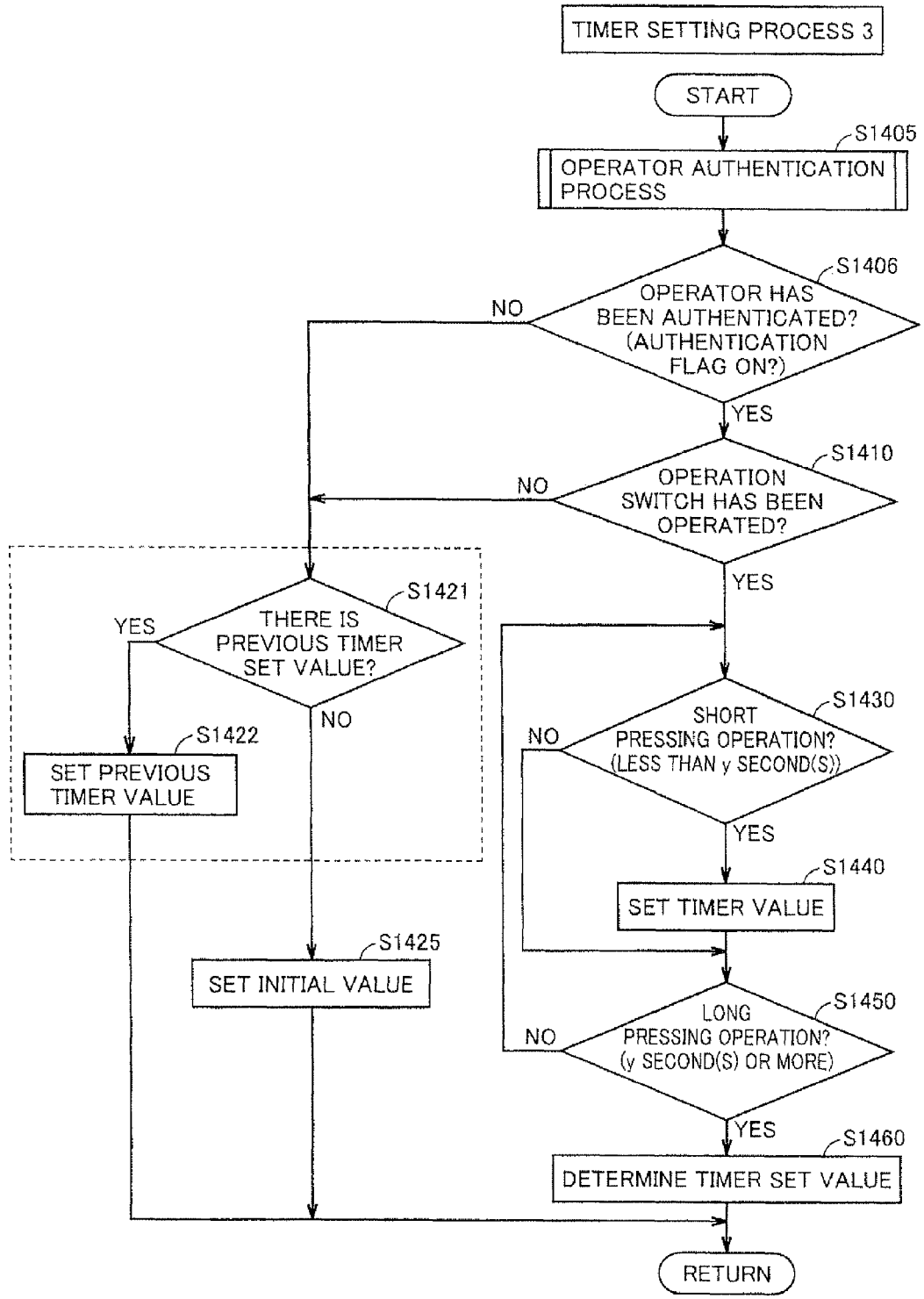
FIG. 15 is a flowchart for illustrating details of a timer setting process performed in S1122 in FIG. 14.

FIG. 15 shows a flowchart for illustrating details of the timer setting process performed in S1122 in FIG. 14. In FIG. 15, steps S1405 and S1406 are added to the flowchart of FIG. 12 described in the first modified example. The descriptions of the steps in FIG. 15 the same as those in FIGS. 10 and 12 will not be repeated.

Figure 16:
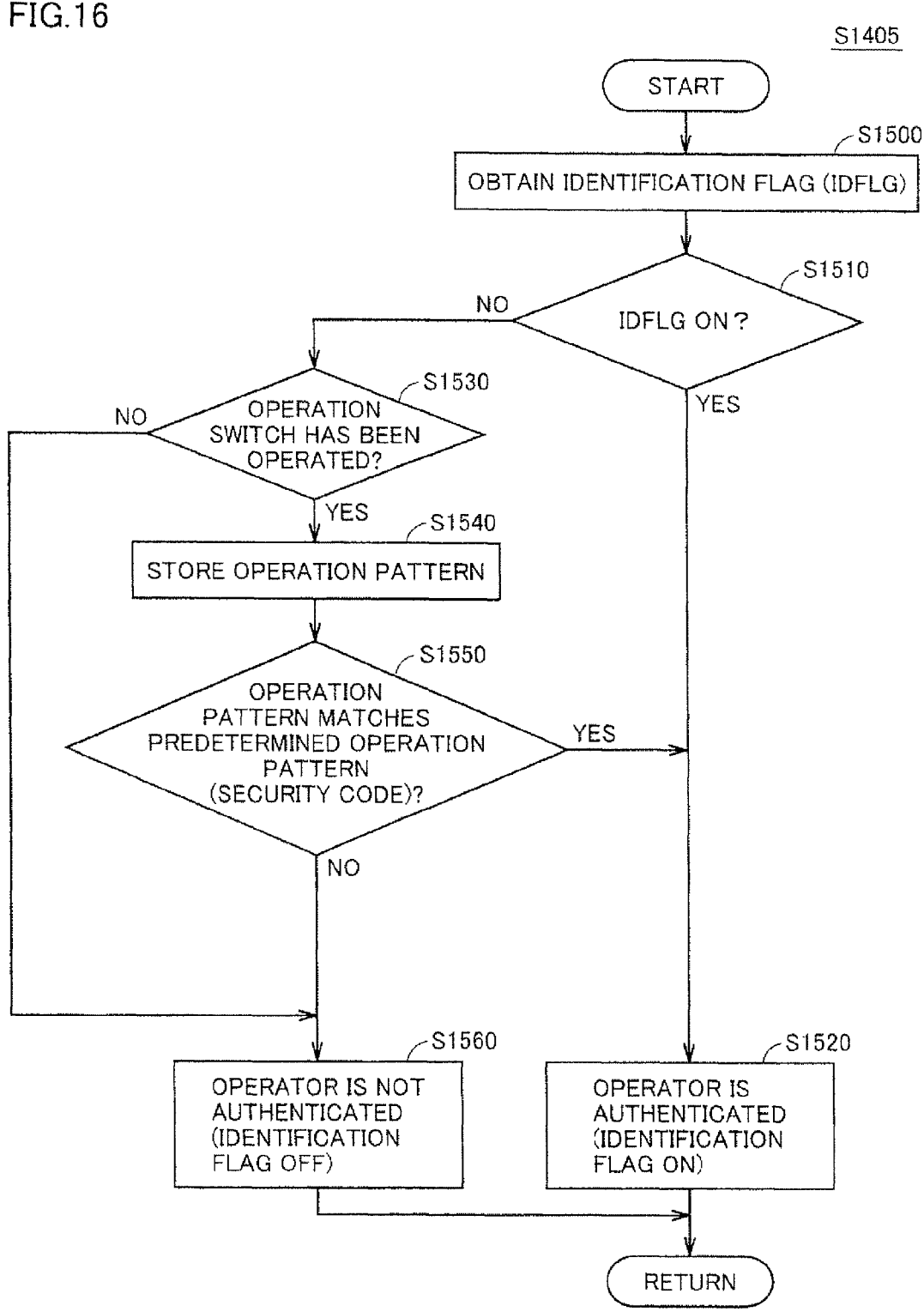
FIG. 16 is a flowchart for illustrating details of an operator authentication process performed in S1405 in FIG. 15.

Referring to FIGS. 5, 13 and 15, in S1405, vehicle ECU 170 performs an operator authentication process by executing a process in accordance with a flowchart shown in FIG. 16 in operator authentication unit 750.

Referring to FIG. 16, in S1500, vehicle ECU 170 obtains identification flag IDFLG from detection device 171. In S1510, vehicle ECU 170 determines whether or not obtained identification flag IDFLG is on (namely, whether or not the identification signal unique to the vehicle received from transmitter 173 matches the predetermined unique value).

If identification flag IDFLG is on (YES in S1520), in S1520, vehicle ECU 170 determines that the person is the operator to be allowed for operation, and sets authentication flag CTF to be on. Then, the process returns to the flow shown in FIG. 15.

If identification flag IDFLG is off (NO in S1520), on the other hand, vehicle ECU 170 determines that the person is not the operator to be allowed for operation based on the identification signal unique to the vehicle received from transmitter 173, and the process proceeds to S1530.

In S1530, vehicle ECU 170 determines whether or not operation switch 314 of charging connector 310 has been operated based on cable connection signal CNCT.

If operation switch 314 has been operated (YES in S1530), in S1540, vehicle ECU 170 stores the operation pattern of operation switch 314.

In S1550, vehicle ECU 170 determines whether or not the stored operation pattern matches the preset and predetermined operation pattern.

If the stored operation pattern matches the predetermined operation pattern (YES in S1550), vehicle ECU 170 proceeds the process to S1520, and determines that the person is the operator to be allowed for operation.

If the stored operation pattern does not match the predetermined operation pattern (NO in S1550), on the other hand, in S1560, vehicle ECU 170 determines that the person is not the operator to be allowed for operation, and sets authentication flag CTF to be off. Then, the process returns to the flow shown in FIG. 15.

If operation switch 314 has not been operated (NO in S1530), vehicle ECU 170 determines that the person is not the operator to be allowed for operation. Then, the processes of S1540 and S1550 are skipped, and the process proceeds to S1560. Then, vehicle ECU 170 sets authentication flag CTF to be off, and the process returns to the flow shown in FIG. 15.

Referring back to FIG. 15, in S1406, vehicle ECU 170 determines whether or not the operator has been authenticated based on authentication flag CTF indicating the determination result of the operator authentication process in S1405.

If the operator has been authenticated (YES in S1406), namely, if authentication flag CTF is on, the process proceeds to S1410. The same process as that of FIG. 12 is executed thereafter, and timer setting is performed with operation switch 314.

If the operator has not been authenticated (NO in S1406), on the other hand, the process proceeds to S1421. Then, vehicle ECU 170 does not allow timer setting operation with operation switch 314, and sets a previously set timer set value as timer time TIM. Alternatively, if previous timer setting was not performed, vehicle ECU 170 sets the initial value as timer time TIM.

By executing the above process, unintended reset of the timer by a person other than the operator to be allowed for operation can be prevented.

Second Embodiment

The first embodiment and its modified examples detailed configurations where the charging information (timer time TIM until the start of charging) is set by operating operation switch 314, with charging connector 310 being connected to vehicle inlet 270.

A second embodiment details a configuration where timer time TIM is set in advance only in charging cable 300, with charging connector 310 not being connected to vehicle inlet 270, and timer time TIM is set in the vehicle upon connection of charging connector 310 to vehicle inlet 270.

Figure 17:
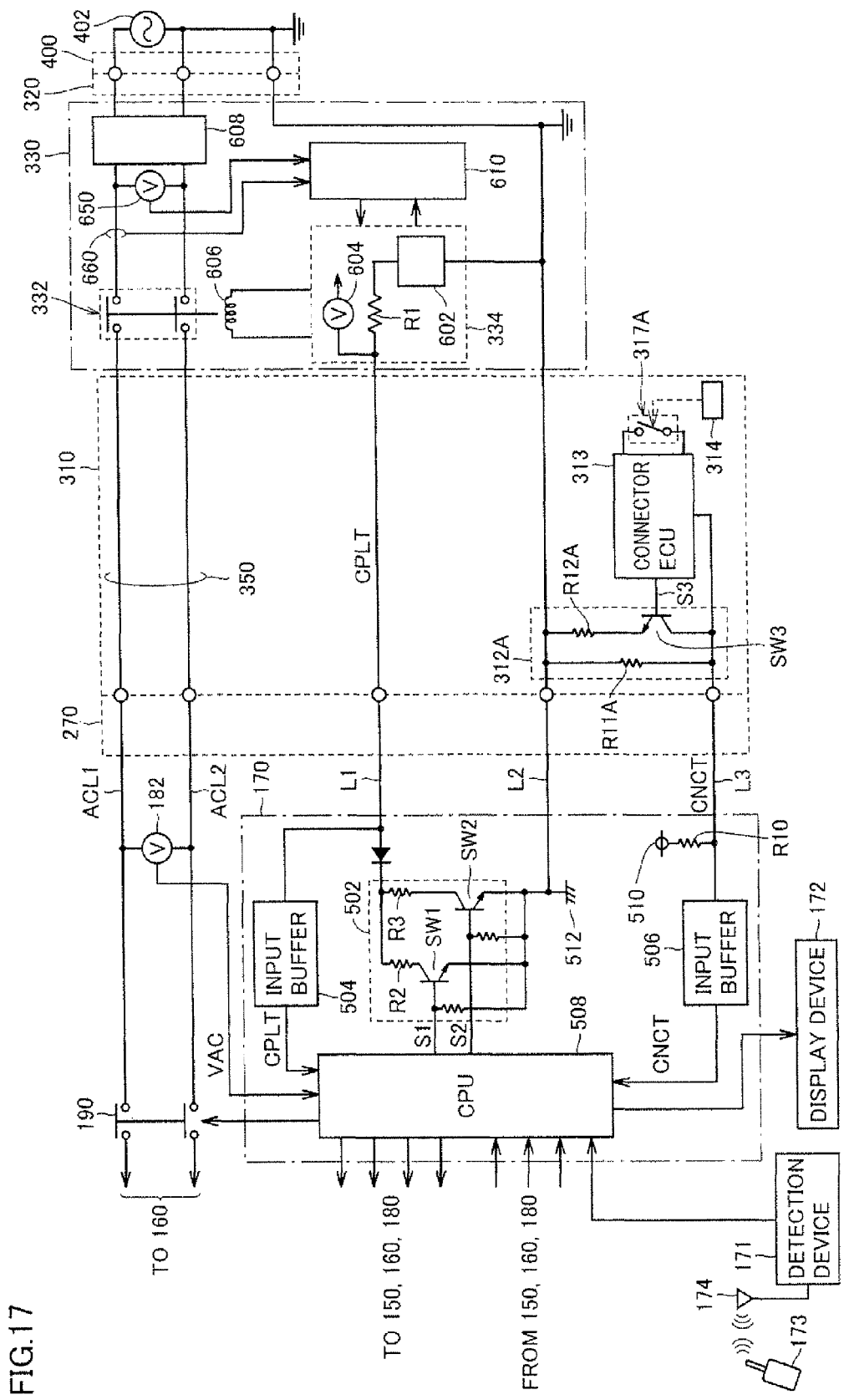
FIG. 17 illustrates the charging circuit shown in FIG. 1 in more detail in a second embodiment.

FIG. 17 illustrates the charging circuit shown in FIG. 1 in more detail in the second embodiment. In FIG. 17, connection detection circuit 312 in FIG. 5 of the first embodiment is replaced with a connection detection circuit 312A, and a connector ECU 313 and a limit switch 317A are added to charging connector 310. The descriptions of the components in FIG. 17 the same as those in FIG. 5 will not be repeated.

Referring to FIG. 17, limit switch 317A has a contact opened and closed in response to operation of operation switch 314. More specifically, the contact of limit switch 317A is opened while operation switch 314 is not operated, and the contact of limit switch 317A is closed when operation switch 314 is pressed. Limit switch 317A is connected to connector ECU 313, and a signal indicating opening/closure of the contact is output to connector ECU 313.

Connection detection circuit 312A includes pull-down resistors R11A, R12A, and a switch SW3.

While charging connector 310 is connected to vehicle inlet 270, pull-down resistor R11A is provided between ground line L2 and connection signal line L3. Pull-down resistor R12A and switch SW3 are connected in series between ground line L2 and connection signal line L3. Switch SW3 is controlled to be on or off in response to a control signal S3 from connector ECU 313.

Connector ECU 313 includes a CPU, a storage device, and input/output buffers, although none is shown, and controls connection detection circuit 312A. Such control is not limited to software processing, but may be processed by building dedicated hardware (electronic circuitry).

Connector ECU 313 receives the signal indicating opening/closure of the contact of limit switch 317A. Connector ECU 313 is also connected to connection signal line L3 via the not-shown input buffer, and detects a potential of connection signal line L3.

Connection detection circuit 312A generates a voltage signal, which is determined based on a voltage (e.g., 12 V) of power supply node 510 and pull-up resistor R10 included in vehicle ECU 170, and pull-down resistors R11A, R12A, in connection signal line L3 as cable connection signal CNCT.

More specifically, while charging connector 310 is not connected to vehicle inlet 270, a voltage having potential V10 (FIG. 7) is generated in connection signal line L3 as cable connection signal CNCT by the voltage of power supply node 510 and pull-up resistor R10. When charging connector 310 is connected to vehicle inlet 270, the potential of connection signal line L3 decreases to V11 (FIG. 7) (V11<V10) by pull-down resistor R11A. Further, when switch SW3 is turned on by control instruction S3 from connector ECU 313, the potential of connection signal line L3 decreases to V12 (FIG. 7) (V12<V11) by pull-down resistor R12A.

Connector ECU 313 detects whether or not charging connector 310 is being connected to vehicle inlet 270 based on the detected potential of connection signal line L3. Since a voltage generated in connection signal line L3 is generated by power from power supply node 510 included in vehicle ECU 170, as described above, the potential of connection signal line L3 detected by connector ECU 313 is 0 V while charging connector 310 is not connected to vehicle inlet 270. While charging connector 310 is connected to vehicle inlet 270, on the other hand, the potential of V11 (FIG. 7) or V12 (FIG. 7) is detected in connection signal line L3, as described above. By detecting the potential of connection signal line L3 in this manner, connector ECU 313 can detect a connection state between charging connector 310 and vehicle inlet 270.

Further, connector ECU 313 controls control signal S3 for switch SW3 in accordance with the connection state between charging connector 310 and vehicle inlet 270.

More specifically, when operation switch 314 is operated (namely, an on signal for limit switch 317A is input) while charging connector 310 is not connected to vehicle inlet 270, connector ECU 313 stores an operation pattern of operation switch 314. Then, upon detecting connection of charging connector 310 to vehicle inlet 270, connector ECU 313 activates control signal S3 in accordance with the stored operation pattern, to transmit operation information about operation switch 314 to vehicle ECU 170.

If charging connector 310 remains connected to vehicle inlet 270 after completion of the transmission of the operation information upon connection of charging connector 310 to vehicle inlet 270, connector ECU 313 maintains control signal S3 in a deactivated state even if operation switch 314 is operated.

With this configuration, timer time TIM can be set in advance in charging connector 310 only while charging connector 310 is not connected to vehicle inlet 270.

Figure 18:
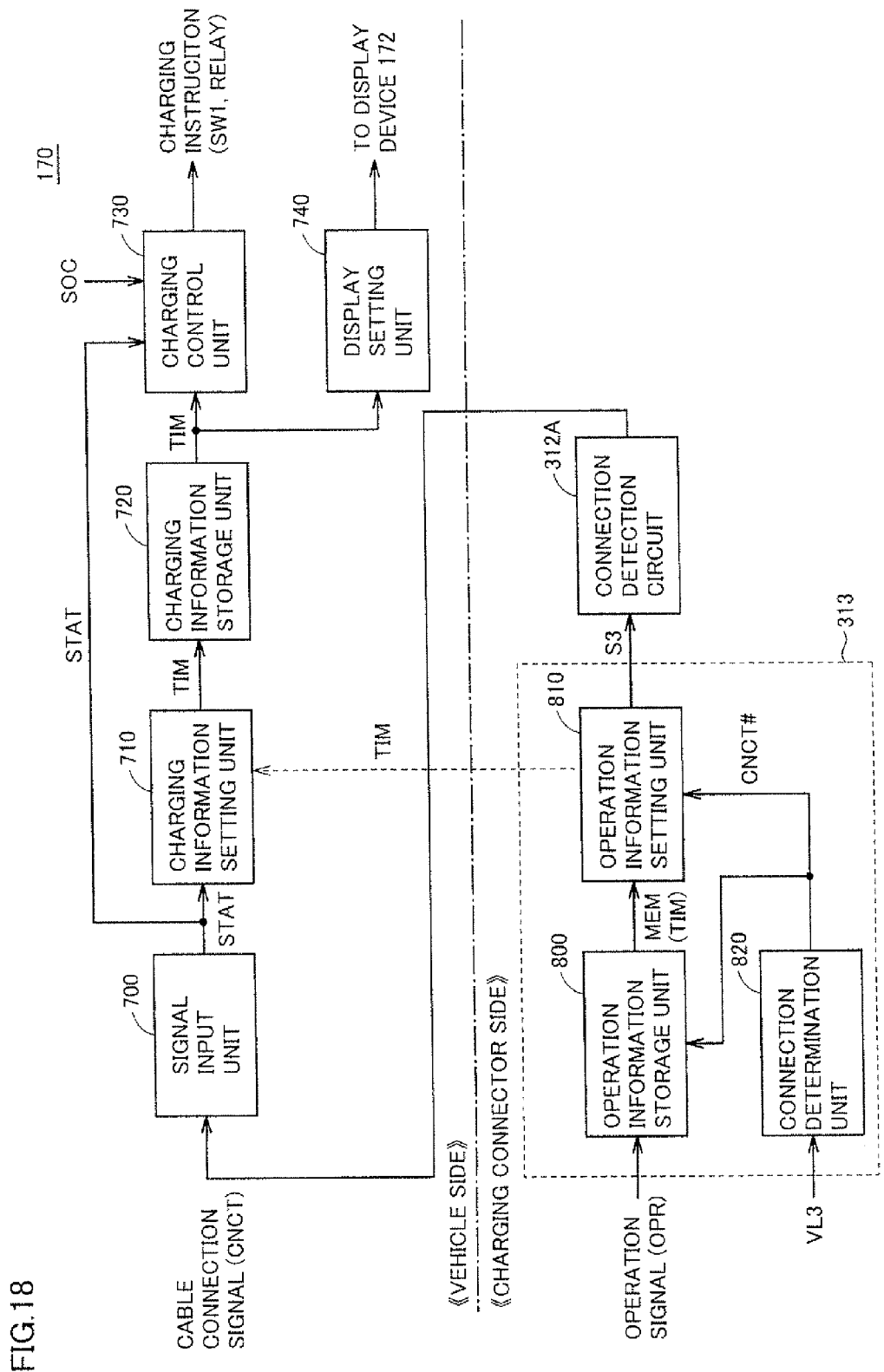
FIG. 18 is a functional block diagram for illustrating charging timer setting control in the second embodiment.

FIG. 18 is a functional block diagram for illustrating the charging timer setting control in the second embodiment. The functional blocks illustrated in the functional block diagram of FIG. 18 are implemented by hardware or software processing by vehicle ECU 170 and connector ECU 313. In FIG. 18, functional blocks included in connection detection circuit 312A and connector ECU 313 are added to the functional block diagram of FIG. 8 described in the first embodiment. The descriptions of the functional blocks in FIG. 18 the same as those in FIG. 8 will not be repeated.

Referring to FIG. 18, connector ECU 313 includes an operation information storage unit 800, an operation information setting unit 810, and a connection determination unit 820.

Connection determination unit 820 receives a potential VL3 of connection signal line L3. Connection determination unit 820 then determines whether or not charging connector 310 is being connected to vehicle inlet 270 based on potential VL3. More specifically, connection determination unit 820 determines that they are not connected to each other when potential VL3 is 0 V, and determines that they are connected to each other when potential VL3 is larger than 0 V.

Then, connection determination unit 820 outputs a cable connection signal CNCT# indicating the determination result to operation information storage unit 800 and operation information setting unit 810. More specifically, cable connection signal CNCT# is set to be on while charging connector 310 is connected to vehicle inlet 270, and cable connection signal CNCT# is set to be off while charging connector 310 is not connected to vehicle inlet 270.

Operation information storage unit 800 receives a signal OPR generated by operation of operation switch 314 from limit switch 317A. Operation information storage unit 800 also receives cable connection signal CNCT# from connection determination unit 820.

If cable connection signal CNCT# is off, namely, if charging connector 310 is not being connected to vehicle inlet 270, operation information storage unit 800 stores an operation pattern MEM of operation signal OPR. If cable connection signal CNCT# is on, namely, if charging connector 310 is being connected to vehicle inlet 270, on the other hand, operation information storage unit 800 does not store the operation pattern of operation signal OPR.

Operation information setting unit 810 receives signal OPR generated by operation of operation switch 314, and cable connection signal CNCT# from connection determination unit 820.

When cable connection signal CNCT# is switched from off to on (namely, when charging connector 310 is connected to vehicle inlet 270), operation information setting unit 810 obtains operation pattern MEM of operation signal OPR stored in operation information storage unit 800, and controls control signal S3 in accordance with the stored operation pattern.

If cable connection signal CNCT# is on after completion of transmission of operation pattern MEM of operation signal OPR stored in operation information storage unit 800, on the other hand, control instruction S3 for switch SW3 is not controlled.

With this configuration, once the timer is set when charging connector 310 is connected, the timer is prohibited from being changed while charging connector 310 is connected.

As described with reference to FIG. 17, connection detection circuit 312A varies the potential of cable connection signal CNCT based on activation or deactivation of switch SW3 in response to control signal S3 from connector ECU 313.

Signal input unit 700 of vehicle ECU 170 receives cable connection signal CNCT whose potential is varied by connection detection circuit 312A, and detects a connection state between charging connector 310 and vehicle inlet 270, and an operation state of operation switch 314. Even if operation switch 314 is operated by charging connector 310 before connection of charging connector 310, switch SW3 is operated in accordance with the operation information stored in connector ECU 313 upon connection of connector 310 as described above, allowing signal input unit 700 to obtain the operation information about operation switch 314.

Vehicle ECU 170 performs charging timer setting control as in the first embodiment, based on cable connection signal CNCT thus received.

The above description detailed a configuration where the operation pattern of operation switch 314 before connection of charging connector 310 is stored, and switch SW3 is operated in accordance with the stored operation pattern. Alternatively, in connector ECU 313, timer time TIM which is set based on the above operation pattern may be stored in operation information storage unit 800. In this case, operation information setting unit 810 may obtain timer time TIM from operation information storage unit 800 upon connection of charging connector 310, and as indicated with a dashed arrow in FIG. 18, directly transmit timer time TIM to charging information setting unit 710 of vehicle ECU 170 via communication, instead of controlling switch SW3.

By configuring such that connector ECU 313 is supplied with power by electric power supplied from a battery (not shown) included in charging connector 310 or CCID 330, timer setting before connection of charging connector 310 can be made without connecting charging cable 300 to external power supply 402. If electric power is supplied to connector ECU 313 by the electric power from external power supply 402, such battery need not be provided.

Additionally, in order to check the contents of timer time TIM which is set before connection of charging connector 310, charging connector 310 may be provided with a display device (not shown).

Figure 19:
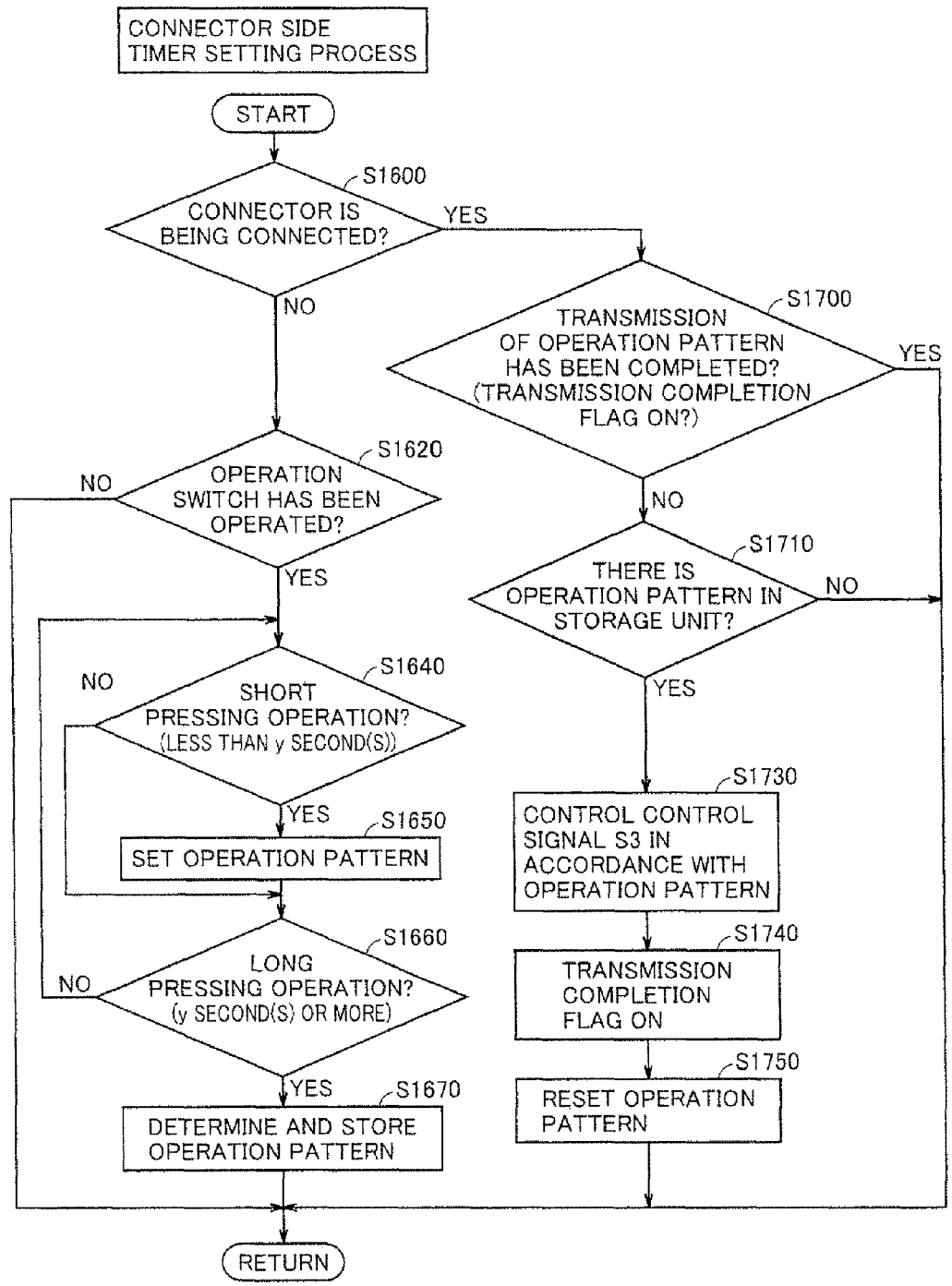
FIG. 19 is a flowchart in a connector ECU for illustrating the charging timer setting control process before connection of the charging connector in the second embodiment.

FIG. 19 shows a flowchart in connector ECU 313 for illustrating the charging timer setting control process before connection of charging connector 310 in the second embodiment. The flowchart shown in FIG. 19 is implemented by calling a program stored in advance in connector ECU 313 from the main routine and executed in a predetermined cycle. Alternatively, some of the steps can be implemented by building dedicated hardware (electronic circuitry).

The control process in vehicle ECU 170 is the same as that shown in FIGS. 9 and 10 described in the first embodiment, and thus description thereof will not be repeated.

Referring to FIGS. 17, 18 and 19, in S1600, connector ECU 313 determines in connection determination unit 820 whether or not charging connector 310 is being connected to vehicle inlet 270.

If charging connector 310 is not being connected to vehicle inlet 270 (NO in S1600), the process proceeds to S1620.

In S1620, connector ECU 313 determines whether or not operation switch 314 of charging connector 310 has been operated.

If operation switch 314 has been operated (YES in S1620), the timer setting operation before connection of charging connector 310 has been performed, and so vehicle ECU 170 proceeds the process to S1640, and determines whether or not the "short pressing operation" of operation switch 314 has been performed.

If the "short pressing operation" of operation switch 314 has been performed (YES in S1640), in S1650, connector ECU 313 sets an operation pattern of operation switch 314. If the "short pressing operation" of operation switch 314 has not been performed (NO in S1640), S1650 is skipped, and the process proceeds to S1660.

In S1660, connector ECU 313 determines whether or not the "long pressing operation" of operation switch 314 has been performed.

If the "long pressing operation" of operation switch 314 has not been performed (NO in S1660), the process returns to S1640, and connector ECU 313 determines whether or not the "short pressing operation" has been performed.

The processes from S1640 to S1660 are repeated until the "long pressing operation" of operation switch 314 is performed, to set the operation pattern of operation switch 314.

If the "long pressing operation" of operation switch 314 has been performed (YES in S1660), namely, if the timer setting operation has been completed, the process proceeds to S1670, where connector ECU 313 determines setting of final operation pattern MEM and stores operation pattern MEM in operation information storage unit 800. The process then returns to the main routine.

If operation switch 314 has not been operated (NO in S1620), the timer setting operation before connection of charging connector 310 has not been performed, and so the process returns to the main routine.

If charging connector 310 is being connected to vehicle inlet 270 in S1600 (YES in S1600), the process proceeds to S1700.

In S1700, connector ECU 313 determines whether or not the transmission of operation pattern MEM of operation switch 314 stored in operation information storage unit 800 to vehicle ECU 170 has been completed, based on a transmission completion flag.

If the transmission of operation pattern MEM has not been completed (NO in S1700), the process proceeds to S1710, where connector ECU 313 determines whether or not operation pattern MEM has been stored in operation information storage unit 800, namely, whether or not the timer setting operation before connection of charging connector 310 has been performed.

If operation pattern MEM has been stored in operation information storage unit 800 (YES in S1710), in S1730, connector ECU 313 controls control signal S3 for switch SW3 in accordance with stored operation pattern MEM. Vehicle ECU 170 sets timer time TIM as in the first embodiment, based on variation in potential of cable connection signal CNCT in response to operation of switch SW3.

When control of control signal S3 for switch SW3 is completed, in S1740, connector ECU 313 sets the transmission completion flag to be on, and in S1750, resets stored operation pattern MEM. Then, the process returns to the main routine.

If operation pattern MEM has not been stored in operation information storage unit 800 (NO in S1710), on the other hand, the timer setting operation before connection of charging connector 310 has not been performed, and so the process returns to the main routine.

If the transmission of operation pattern MEM has been completed (YES in S1700), the process returns to the main routine.

Although not shown, the transmission completion flag is set to be off when charging connector 310 is disconnected from vehicle inlet 270.

By executing the above process, charging timer setting can be made in advance in charging connector 310 before charging connector 310 is connected to vehicle inlet 270, and timer setting after connection of charging connector 310 can be prohibited. As a result, operability during charging operation can be improved, and change in timer set value not intended by the operator can be prevented while charging connector 310 is connected.

In the second embodiment, vehicle ECU 170 can have functions similar to those of the first and second modified examples of the first embodiment. Namely, as to the first modified example, the functions can be implemented by executing the process of connector ECU 313 shown in FIG. 19, as well as the process of vehicle ECU 170 in accordance with the flowcharts described with reference to FIGS. 11 and 12. As to the second modified example, the functions can be implemented by executing the process of vehicle ECU 170 in accordance with the flowcharts described with reference to FIGS. 14 to 16.

When the second modified example is applied, unless the operator to be allowed for operation is authenticated, timer time TIM is not set in vehicle ECU 170 even if the charging information is transmitted from connector ECU 313 to vehicle ECU 170 upon connection of charging connector 310.

If the operator authentication function is not provided in the second embodiment, the timer set value may be changed if charging connector 310 is disconnected and the timer is reset. For this reason, if the operator authentication function is not provided, it is preferable to further include a connector lock mechanism that prevents disconnection of charging connector 310 from vehicle inlet 270 after charging connector 310 is connected.

Figure 20:
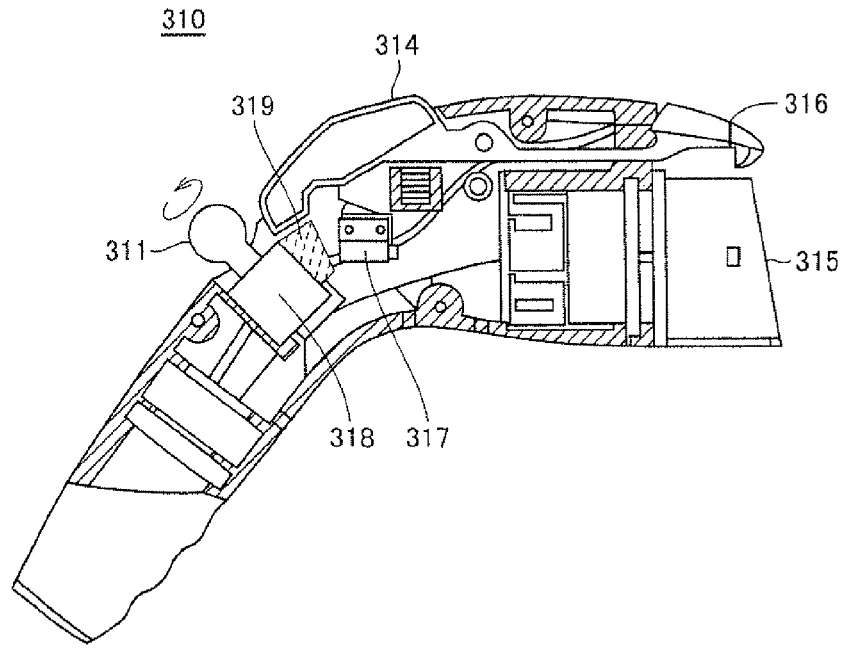
FIG. 20 shows a first example of a connector lock mechanism.
Figure 21:
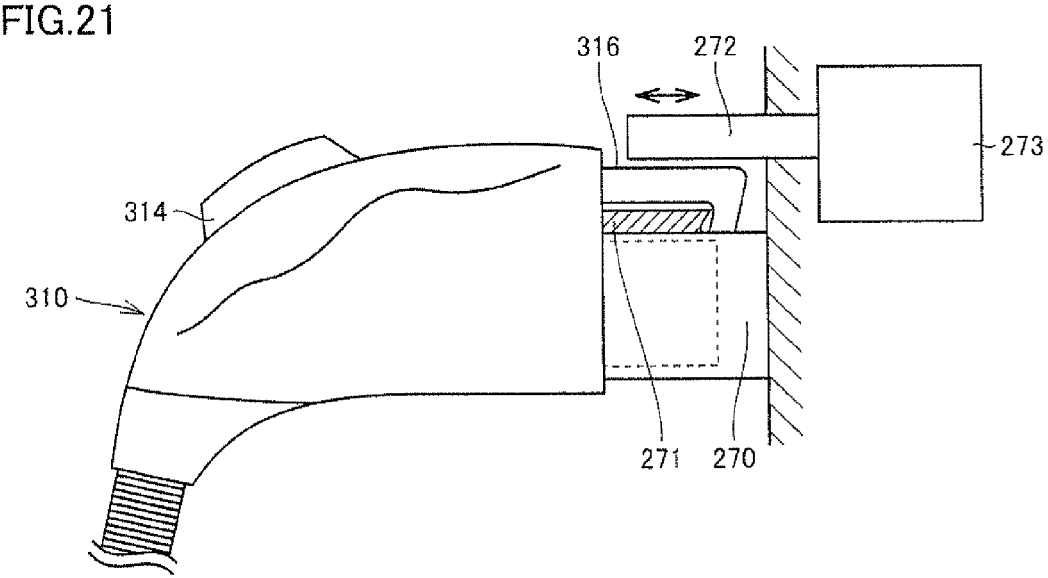
FIG. 21 shows a second example of the connector lock mechanism.

Examples of the connector lock mechanism include the one shown in FIG. 20, where charging connector 310 is provided with a cylindrical key lock 318, and a fixing member 319 is inserted in a movable range of operation switch 314 by locking operation with a key 311, to prevent mechanical operation of operation switch 314. Alternatively, a mechanism as shown in FIG. 20 may be provided, where a lock device 273 including a fixing member 272 lying immediately over a latch unit 316 to fix latch unit 316 while charging connector 310 is connected to vehicle inlet 270 is provided in the vicinity of vehicle inlet 270, to prevent operation of latch unit 316 of charging connector 310 even if operation switch 314 is operated.

[Modified Examples of Configurations of Motor Driving Device and Power Converter for Charging]

As can be understood from the above description, in the embodiments and their modified examples of the present invention, the circuit configurations of motor driving device 180 and charging device 160 shown in FIG. 1 are not particularly limited, and the present invention is applicable. Examples of a representative configuration of motor driving device 180 will be described.

Figure 22:
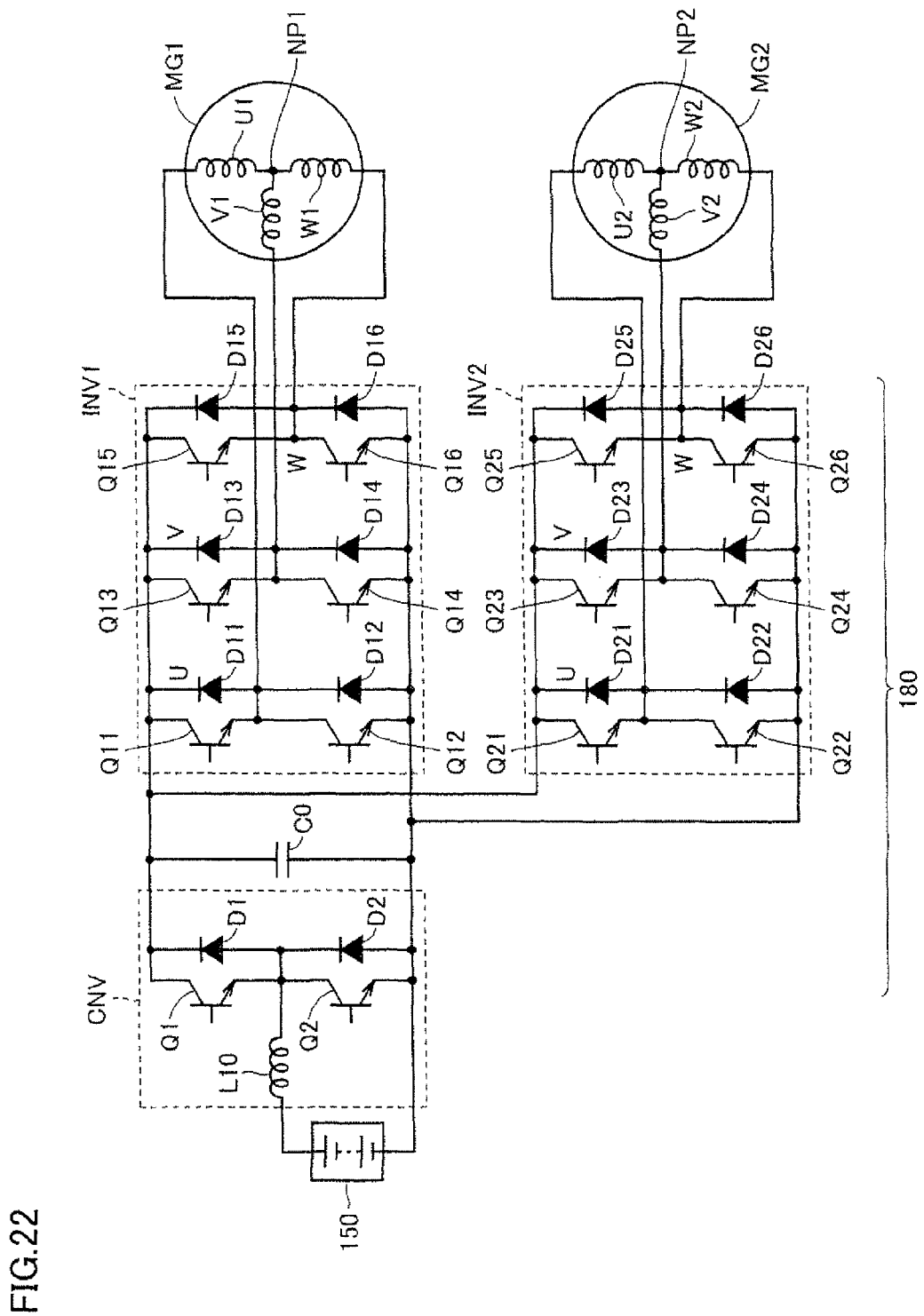
FIG. 22 shows an example of a representative configuration of a motor driving device in the present embodiment.

Referring to FIG. 22, motor driving device 180 includes a converter CNV capable of boosting an output voltage (DC voltage) from power storage device 150, a smoothing capacitor C0 for smoothing the DC voltage output from converter CNV, and inverters INV1, INV2 for converting the DC voltage held in smoothing capacitor C0 to an AC voltage. Two motor generators MG1, MG2 are provided correspondingly to inverters INV1, INV2, respectively.

Converter CNV includes a reactor L10, semiconductor switching elements Q1, Q2, and antiparallel diodes D1, D2 connected in antiparallel to semiconductor switching elements Q1, Q2. Converter CNV can function as the so-called boost chopper in response to on/off control of semiconductor switching elements Q1, Q2. Namely, by duty control of semiconductor switching elements Q1 and Q2, a voltage applied to smoothing capacitor C0, namely, an output voltage from the converter can be variably controlled.

Inverter INV1 is a usual three-phase inverter including semiconductor switching elements Q11 to Q16 and antiparallel diodes D11 to D16. Likewise, inverter INV2 is a usual three-phase inverter including semiconductor switching elements Q21 to Q26 and antiparallel diodes D21 to D26.

Motor generators MG1 and MG2 are both connected to an engine (not shown) and a power split device (not shown), and motor generator MG2 can generate a driving force of wheel 130 as with MG 120 shown in FIG. 1.

That is, in the configuration shown in FIG. 22, a driving force of wheel 130 is generated by an output from the engine and an output from motor generator MG2. Motor generator MG2 generates electric power by regeneration during regenerative braking of electrically powered vehicle 10. Electric power from this regeneration is converted to a DC voltage by inverter INV2, applied to smoothing capacitor C0, and charges power storage device ISO via converter CNV.

Motor generator MG1 can operate as a power generator by being driven by the engine, and operate as a motor to start the engine during engine startup. If the power split device is formed of a planetary gear mechanism, a continuously variable transmission mechanism for variably controlling a ratio of rotation speed of motor generators MG1 and MG2 and engine speed can be formed, so that an operating point of the engine can be set appropriately.

Figure 23:
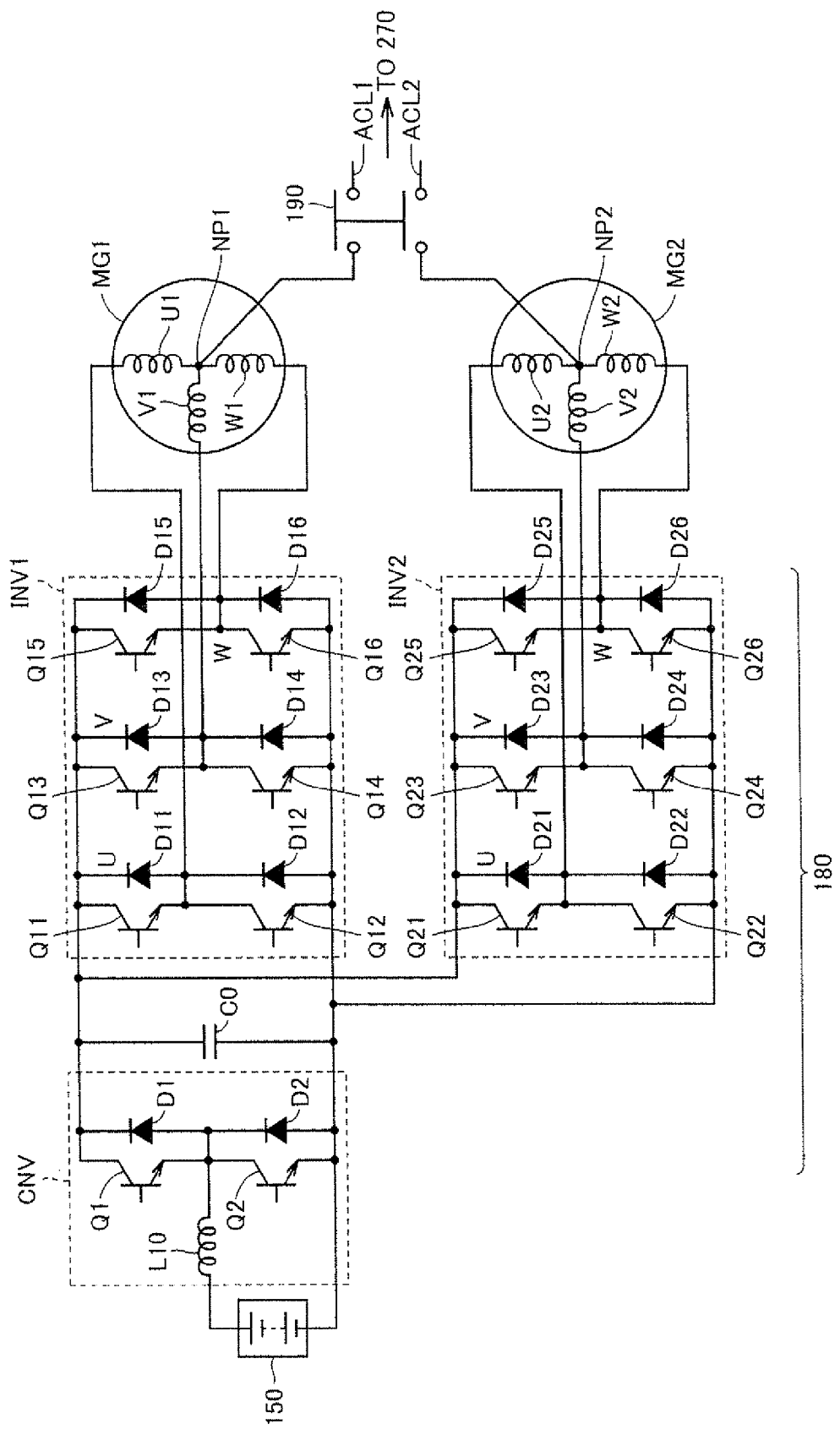
FIG. 23 shows a modified example of the motor driving device in the present embodiment.

Alternatively, as shown in FIG. 23, the configuration of motor driving device 180 shown in FIG. 22 may be employed, in which charging device 160 for charging by external power supply 402 as shown in FIG. 1 is not separately provided, and a neutral point NP1 of motor generator MG1 and a neutral point NP2 of motor generator MG2 are connected to single-phase AC external power supply 402, to charge power storage device 150.

In this case, reactor components of motor generators MG1, MG2 (coil windings U2, V1, V2, W1, W2) and inverters INV1, INV2 form a power converter for converting an AC voltage from external power supply 402 to a DC voltage. In this manner, charging device 160 can also be formed of motor driving device 180.

More specifically, a configuration may be employed where power lines ACL1 and ACL2 shown in FIG. 1 are connected to neutral points NP1 and NP2 via relay 190, respectively.

In the embodiments, charging connector 310 and plug 320 are examples of "first connection unit" and "second connection unit" of the present invention, respectively. Moreover, in the embodiments, vehicle ECU 170 and connector ECU 313 are examples of "first control device" and "second control device" of the present invention, respectively.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 electrically powered vehicle; 120 MG; 130 wheel; 150 power storage device; 160 charging device; 170 vehicle ECU;

171 detection device; 172 display device; 172A indicating lamp; 172B indicator; 173 transmitter; 174 communication unit; 180 motor driving device; 182, 604, 650 voltage sensor; 190 relay; 270 vehicle inlet; 271 projection; 272, 319 fixing member; 273 lock device; 300 charging cable; 310 charging connector; 311 key; 312, 312A connection detection circuit; 313 connector ECU; 314 operation switch; 315 coupler unit; 316 latch unit; 317, 317A limit switch; 318 key lock; 320 plug; 330 CCID; 332 CCID relay; 334 control pilot circuit; 340, 340A, 340B power line unit; 350 power line; 400 power outlet; 402 external power supply; 502 resistor circuit; 504, 506 input buffer; 508 CPU; 510 power supply node; 512 vehicle ground; 602 oscillator; 606 electromagnetic coil; 608 leakage detector; 610 CCID control unit; 660 current sensor; 700 signal input unit; 710 charging information setting unit; 720 charging information storage unit; 730 charging control unit; 740 display setting unit; 750 operator authentication unit; 800 operation information storage unit; 810 operation information setting unit; 820 connection determination unit; ACL1, ACL2 power line; C0 smoothing capacitor; CNV converter; D1, D2, D11 to D14, D21 to D26 antiparallel diode; INV1, INV2 inverter; L1 control pilot line; L10 reactor; L2 ground line; L3 connection signal line; MG1, MG2 motor generator; NP1, NP2 neutral point; Q1, Q2, Q11 to Q16, Q21 to Q26 semiconductor switching element; R1 resistor element; R10 pull-up resistor; R2, R3, R11, R12, R11A, R12A pull-down resistor; SW1, SW2, SW3 switch; U1, U2, V1, V2, W1, W2 coil winding

The invention claimed is:

1. A vehicle to be charged with electric power supplied from an external power supply via a charging cable,
    said charging cable including
        a power line for transmitting the electric power supplied from said external power supply,
        a first connection unit provided on an end portion of said power line near the vehicle, for being connected to said vehicle, and
        an operation switch provided on said first connection unit,
    said vehicle including
        a power storage device configured to be charged with the electric power supplied from said external power supply,
        a vehicle inlet for being connected to said first connection unit,
        a charging device connected to said vehicle inlet, for converting the electric power supplied from said external power supply to charge said power storage device, and
        a first control device for controlling said charging device,
    said operation switch being a release button operated when said first connection unit is disconnected from said vehicle inlet,
    said first control device including a charging information setting unit configured to set charging information about charging performed by said charging device based on a signal generated by operation of said operation switch.

2. The vehicle according to claim 1, wherein
    said charging information includes information about a time to start charging, and
    said first control device further includes a charging control unit configured to control said charging device to start charging after a lapse of said time to start charging that has been set by said charging information setting unit.

3. The vehicle according to claim 1, wherein
    said first control device further includes a signal input unit configured to detect input of the signal generated by operation of said operation switch while said first connection unit is connected to said vehicle inlet.

4. The vehicle according to claim 1, wherein
    said charging cable further includes a second control device capable of inputting and outputting a signal from and to said first control device, for outputting operation information based on the signal generated by operation of said operation switch to said first control device, while said first connection unit is connected to said vehicle inlet,
    said second control device includes
        an operation information storage unit configured to store the operation information based on the signal generated by operation of said operation switch while said first connection unit is not connected to said vehicle inlet, and
        an operation information setting unit configured to transmit the operation information stored in said operation information storage unit to said first control device when said first connection unit is connected to said vehicle inlet, and
    said charging information setting unit sets said charging information based on the operation information transmitted from said operation information setting unit.

5. The vehicle according to claim 1, wherein
    said first control device further includes an operator authentication unit for authenticating an operator to be allowed for operation, and
    said charging information setting unit sets said charging information when said operator to be allowed for operation is authenticated by said operator authentication unit.

6. The vehicle according to claim 5, further comprising a detection device for detecting an identification signal unique to said vehicle transmitted from a transmitter, wherein
    said operator authentication unit authenticates said operator to be allowed for operation when said identification signal is detected by said detection device.

7. The vehicle according to claim 5, wherein
    said operator authentication unit authenticates said operator to be allowed for operation when said operation switch is operated in a predetermined order of operation.

8. The vehicle according to claim 1, further comprising a display device for displaying said charging information that has been set by said charging information setting unit.

9. A charging cable for transmitting electric power supplied from an external power supply to charge a vehicle,
    said vehicle including
        a power storage device configured to be charged with the electric power supplied from said external power supply,
        a vehicle inlet for being connected to said charging cable,
        a charging device connected to said vehicle inlet, for converting the electric power supplied from said external power supply to charge said power storage device, and
        a first control device for controlling said charging device,
    said charging cable including
        a power line for transmitting the electric power supplied from said external power supply,
        a first connection unit provided on an end portion of said power line near the vehicle, for being connected to said vehicle inlet,
        an operation switch provided on said first connection unit, and
        a second control device capable of inputting and outputting a signal from and to said first control device, for outputting operation information based on a signal generated by operation of said operation switch to said first control device, while said first connection unit is connected to said vehicle inlet, said operation switch being a release button operated when said first connection unit is disconnected from said vehicle inlet, said second control device including an operation information storage unit configured to store the operation information based on the signal generated by operation of said operation switch while said first connection unit is not connected to said vehicle inlet, and an operation information setting unit configured to transmit the operation information stored in said operation information storage unit to said first control device when said first connection unit is connected to said vehicle inlet.

10. The charging cable according to claim 9, further comprising a second connection unit for being connected to said external power supply, wherein said operation information storage unit stores the operation information based on the signal generated by operation of said operation switch when said operation switch is operated while said second connection unit is connected to said external power supply.

11. The charging cable according to claim 9, wherein if said first connection unit remains connected to said vehicle inlet after the operation information stored in said operation information storage unit was transmitted to said first control device, said operation information setting unit prohibits transmission of the operation information based on the signal generated by operation of said operation switch even if said operation switch is operated.

12. A charging system for a vehicle for charging a power storage device, comprising:

the vehicle including said power storage device; and a charging cable for transmitting electric power supplied from an external power supply outside of said vehicle to said power storage device, said vehicle including a vehicle inlet for being connected to said charging cable, a charging device connected to said vehicle inlet, for converting the electric power supplied from said external power supply to charge said power storage device, and a first control device for controlling said charging device, said charging cable including a power line for transmitting the electric power supplied from said external power supply, a first connection unit provided on an end portion of said power line near the vehicle, for being connected to said vehicle inlet, and an operation switch provided on said first connection unit, said operation switch being a release button operated when said first connection unit is disconnected from said vehicle inlet, said first control device including a charging information setting unit configured to set charging information about charging performed by said charging device based on a signal generated by operation of said operation switch.

13. The charging system for a vehicle according to claim 12, wherein said charging cable further includes a second control device capable of inputting and outputting a signal from and to said first control device, for outputting operation information based on the signal generated by operation of said operation switch to said first control device, while said first connection unit is connected to said vehicle inlet, said second control device includes an operation information storage unit configured to store the operation information based on the signal generated by operation of said operation switch while said first connection unit is not connected to said vehicle inlet, and an operation information setting unit configured to transmit the operation information stored in said operation information storage unit to said first control device when said first connection unit is connected to said vehicle inlet, and said charging information setting unit sets said charging information based on the operation information transmitted from said operation information setting unit.

* * * * *